US007817897B2

(12) United States Patent
Kiyama et al.

(10) Patent No.: US 7,817,897 B2
(45) Date of Patent: Oct. 19, 2010

(54) METHOD FOR RECORDING AV DATA, AV DATA RECORDING APPARATUS, DATA RECORDING MEDIUM, PROGRAM AND PROGRAM RECORDING MEDIUM

(75) Inventors: Jiro Kiyama, Funabashi (JP); Yuri Iwano, Chiba (JP); Takayoshi Yamaguchi, Nagareyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1452 days.

(21) Appl. No.: 10/531,534

(22) PCT Filed: Oct. 15, 2003

(86) PCT No.: PCT/JP03/13209

§ 371 (c)(1), (2), (4) Date: Apr. 15, 2005

(87) PCT Pub. No.: WO2004/036582

PCT Pub. Date: Apr. 29, 2004

(65) Prior Publication Data

US 2006/0007814 A1 Jan. 12, 2006

(30) Foreign Application Priority Data

Oct. 17, 2002 (JP) ............................ 2002-303648
Jan. 10, 2003 (JP) ............................ 2003-005058

(51) Int. Cl.
*H04N 5/91* (2006.01)
*H04N 7/00* (2006.01)

(52) U.S. Cl. ........................ 386/46; 369/47.1; 369/59.1

(58) Field of Classification Search .................. 386/46; 369/47.1, 59.1
See application file for complete search history.

(56) References Cited

U.S. PATENT DOCUMENTS 5,778,136 A 7/1998 Hirayama et al.

(Continued)

FOREIGN PATENT DOCUMENTS

EP 0 949 825 10/1999

(Continued)

OTHER PUBLICATIONS

European Search Report for EP10158069.4 (May 26, 2010).

(Continued)

*Primary Examiner*—Thai Tran
*Assistant Examiner*—Girumsew Wendmagegn
(74) *Attorney, Agent, or Firm*—David G. Conlin; Steven M. Jensen; Edwards Angell Palmer & Dodge LLP

(57) ABSTRACT

An original stream file and an after-recording data file are managed as different files. In the original stream file, data is made up of sets of partial data (CU) divided in accordance with a predetermined interval. Likewise, in the after-recording data file, data is made up of sets of partial data (CA) divided in accordance with a predetermined interval. These sets of data are recorded onto a disc such that the after-recorded data (CA) is recorded in a region adjacent to a relevant original stream (CU). This allows reproduction and real-time after-recording with the use of a general MPEG-2 PS/TS decoder. Moreover, this allows realization of data recording that causes less interruption of reproduction when non-destructive editing is carried out with respect to an after-recorded result.

7 Claims, 24 Drawing Sheets

U.S. PATENT DOCUMENTS

| | | | | |
|---|---|---|---|---|
| 5,808,987 | A | 9/1998 | Oda et al. | |
| 5,884,004 | A * | 3/1999 | Sato et al. | 386/98 |
| 6,088,507 | A | 7/2000 | Yamauchi et al. | |
| 6,122,436 | A | 9/2000 | Okada et al. | |
| 6,137,954 | A | 10/2000 | Sawabe et al. | |
| 6,253,021 | B1 | 6/2001 | Yagi et al. | |
| 6,278,834 | B1 | 8/2001 | Yagi et al. | |
| 6,282,363 | B1 | 8/2001 | Yagi et al. | |
| 6,393,206 | B1 | 5/2002 | Yagi et al. | |
| 6,404,980 | B1 | 6/2002 | Yagi et al. | |
| 6,526,217 | B1 | 2/2003 | Fujinami | |
| 6,798,981 | B1 | 9/2004 | Yamauchi et al. | |
| 6,954,419 | B1 | 10/2005 | Kimura et al. | |
| 7,130,525 | B1 | 10/2006 | Iwano | |
| 2001/0046377 | A1 | 11/2001 | Yagi et al. | |
| 2002/0141738 | A1 | 10/2002 | Yagi et al. | |
| 2003/0103766 | A1 * | 6/2003 | Sugahara et al. | 386/96 |
| 2003/0113095 | A1 | 6/2003 | Fujinami | |
| 2004/0071446 | A1 | 4/2004 | Yagi et al. | |
| 2005/0008337 | A1 | 1/2005 | Yamauchi et al. | |
| 2005/0008338 | A1 | 1/2005 | Yamauchi et al. | |

FOREIGN PATENT DOCUMENTS

| | | | |
|---|---|---|---|
| EP | 1 130 596 | | 9/2001 |
| EP | 1 206 135 | A1 | 5/2002 |
| EP | 1 227 679 | | 7/2002 |
| JP | 08-329661 | | 12/1996 |
| JP | 10-255448 | | 9/1998 |
| JP | 11-066728 | | 3/1999 |
| JP | 11-144378 | | 5/1999 |
| JP | 11-203786 | | 7/1999 |
| JP | 11-298845 | | 10/1999 |
| JP | 2000-195231 | | 7/2000 |
| JP | 2000-306327 | | 11/2000 |
| JP | 2000-339860 | | 12/2000 |
| JP | 2001-043616 | | 2/2001 |
| JP | 2002-171472 | | 6/2002 |
| JP | 2002-209186 | | 7/2002 |
| JP | 2002-245753 | | 8/2002 |
| JP | 2003-169292 | | 6/2003 |
| JP | 2004-120098 | | 4/2004 |
| WO | WO-99/31657 | | 6/1999 |

OTHER PUBLICATIONS

European Search Report for EP10158064.5 (May 20, 2010).
European Search Report for EP10158067.8 (May 20, 2010).
European Search Report for EP10158070.2 (May 27, 2010).
European Search Report for EP10158071.0 (May 20, 2010).

* cited by examiner

FIG. 9

```
STREAM MANAGEMENT INFORMATION FILE {
                        o_attribute()
                        video_unit_table()
                        p_attribute()
                        continuous_area_table()

}
```

```
video_unit_table() {
        number_of_video_unit
        for (i=0; i<number_of_video_unit; i++){
                video_unit_info()
        }
}
```

FIG. 10 (b)

```
video_unit_info() {
        VU_flags
        VU_PTS
        VU_PN
}
```

FIG. 11 (a)

```
VU_flags(){
        first_unit_flag
}
```

FIG. 11 (b)

| | | |
|---|---|---|
| first_unit_flag | 0b | NOT POSITIONED IN HEAD OF CU |
| | 1b | POSITIONED IN HEAD OF CU |

FIG. 12 (a)

```
continuous_area_table() {
        number_of_continuous_area
        for (i=0; i<number_of_continuous_area; i++){
                continuous_area_info()
        }
}
```

FIG. 12 (b)

```
continuous_area_info() {
        CA_flags
        CA_PTS
        CA_PN
}
```

FIG. 13 (a)

```
CA_flags(){
        placement_flag
}
```

FIG. 13 (b)

| | | |
|---|---|---|
| placement_flag | 0b | NOT POSITIONED JUST BEFORE RELEVANT CU |
| | 1b | POSITIONED JUST BEFORE RELEVANT CU |

FIG. 14

```
PROGRAM INFORMATION FILE {
                pg_attribute()
                scene_table()
}
```

FIG. 15 (a)

```
scene_table() {
        number_of_scene
        for (i=0; i<number_of_scene; i++){
                scene_info()
        }
}
```

FIG. 15 (b)

```
scene_info() {
        sc_filename
        sc_start_PTS
        sc_duration
}
```

100SHARP

SHRP0001.PGM — PROGRAM INFORMATION FILE

SHRP0001.OMI — ORIGINAL STREAM MANAGEMENT INFORMATION FILE

SHRP0001.M2P — ORIGINAL STREAM FILE

SHRP0001.RSV — AFTER-RECORDING REGION RESERVATION FILE

SHRP0001.PMI — AFTER-RECORDING DATA MANAGEMENT INFORMATION FILE

SHRP0001.PRE — AFTER-RECORDING DATA FILE

SHRP0001.PNG — GRAPHICS FILE

⋮

SHRP0099.PGM

FIG. 24

```
PROGRAM INFORMATION FILE {
                pg_attribute()
                scene_table()
                subaudio_table()
                graphics_table()
}
```

FIG. 25 (a)

```
subaudio_table() {
        number_of_subaudio
        for (i=0; i<number_of_subaudio; i++){
                subaudio_info()
        }
}
```

FIG. 25 (b)

```
subaudio_info() {
        SA_filename
        SA_flags
        SA_start_time
        SA_duration
}
```

FIG. 26 (a)

```
graphics_table() {
        number_of_graphics
        for (i=0; i<number_of_graphics; i++){
                graphics_info()
        }
}
```

FIG. 26 (b)

```
graphics_info() {
        gr_filename
        gr_flags
        gr_start_time
        gr_duration
}
```

FIG. 27 (a)

```
SA_flags/gr_flags(){
        interleaved_flag
}
```

FIG. 27 (b)

| | | |
|---|---|---|
| interleaved_flag | 0b | NOT POSITIONED JUST BEFORE RELEVANT CU |
| | 1b | POSITIONED JUST BEFORE RELEVANT CU |

METHOD FOR RECORDING AV DATA, AV DATA RECORDING APPARATUS, DATA RECORDING MEDIUM, PROGRAM AND PROGRAM RECORDING MEDIUM

TECHNICAL FIELD

The present invention relates to (i) a method for recording image data and audio data onto a random accessible recording medium such as a hard disk, an optical disc, and a semiconductor memory; to (ii) a recording apparatus; and to (iii) a recording medium.

BACKGROUND ART

A video digital recording/reproducing apparatus (hereinafter, referred to as "video disc recorder") using a disc medium has begun to be pervasive. Required is a technique for realizing, at an inexpensive price, an after-recording function in such a video disc recorder, as is the case with a tape medium. The after-recording function refers to a technique for further adding information, especially audio information, to recorded audio information and/or recorded video information.

A conventional technique for realizing such an after-recording function using a disc medium was provided by the present inventors, and is disclosed in Japanese Laid-Open Patent Publication Tokukai 2001-43616 (published on Feb. 16, 2001). The following briefly explains this technique with reference to FIG. 20(*a*) and FIG. 20(*b*).

In Japanese Laid-Open Patent Publication Tokukai 2001-43616, a stream file 3000 is in compliance with a unique stream format, and is so structured that regions for storing the after-recorded data are inserted among original stream data (initially recorded video/audio data) divided at a predetermined reproduction time interval. The after-recorded data is reproduced in synchronism with the original stream data. For example, FIG. 20(*a*) illustrates that an after-recording data region 3011 for storing after-recorded audio data that is to be reproduced in synchronism is inserted just before partial original stream data 3021. Likewise, after-recording data regions 3012 and 3013 are inserted just before partial original stream data 3022 and 3023, respectively.

The stream file 3000 is recorded onto an optical disc 3001 such that each set of partial original stream data and each after-recording data region are disposed physically adjacent to each other as shown in FIG. 20(*b*). This minimizes-seeking operation during the synchronous reproduction of the partial original stream data and the after-recorded data, and restrains interruption of the reproduction due to the seeking operation. Further, a real-time after-recording is ensured by setting reproduction time of the partial original stream data to such a value (roughly several seconds) that allows for the real-time after-recording and that is determined in consideration of a seeking time.

Incidentally, examples of widely used data recording method are: Transport Stream (hereinafter, referred to as "MPEG-2 TS") and Program Stream (hereinafter, referred to as "MPEG-2 PS"), each of which has a different structure from the stream structure described in Japanese Laid-Open Patent Publication Tokukai 2001-43616, and each of which is defined by ISO/IEC 13818-1. For example, MPEG-2 PS is used for DVD-Video, and MPEG-2 TS is used for a data transfer format between devices by way of digital broadcasting or the IEEE-1394. Conventional after-recording techniques in consideration of MPEG-2 PS/TS are described in Japanese Laid-Open Patent Publication Tokukai 2000-306327 (published on Nov. 2, 2000), and Japanese Laid-Open Patent Publication Tokukaihei 11-298845/1999 (published on Oct. 29, 1999).

However, in cases where the stream structure described in Japanese Laid-Open Patent Publication Tokukai 2001-43616 is applied to MPEG-2 PS/TS, a general decoder possibly cannot normally carry out decoding for reproduction. A reason for this is explained as follows.

It is determined in MPEG-2 TS/PS that video data and audio data are multiplexed such that no underflow and no overflow occur in respective buffer memories of an audio decoder and a video decoder that are in compliance with a decoder model set as a standard (reference). However, in the stream structure of Japanese Laid-Open Patent Publication Tokukai 2001-43616, audio data corresponding to one second or longer is stored in each of the after-recording data regions. When such a stream file is reproduced by using a general MPEG-2 TS/PS decoder, the MPEG-2 TS/PS decoder receives, at a time, the audio data corresponding to one second or longer. This causes overflow of the buffer memory of the audio decoder.

Further, according to the after-recording function described in Japanese Laid-Open Patent Publication Tokukai 2000-306327, the after-recording data region is multiplexed in the stream in accordance with the aforementioned MPEG-2 PS multiplexing rule; however, the after-recording function suffers from a difficulty in the real-time after-recording when a transfer rate to or from a disc is low.

On the other hand, in Japanese Laid-Open Patent Publication Tokukaihei 11-298845/1999, the after-recorded data and the original stream data are recorded onto different files such that each of the files is in compliance with the MPEG-2 PS multiplexing rule. In this case, a file containing the after-recorded data and a file containing the original stream data are alternately read out, so that a seeking operation is required to be repeated during the reproduction of the after-recorded result. For this reason, when a non-destructive editing is carried out with respect to the after-recorded result, the seeking operation is more likely to cause interruption of reproduction especially between scenes. The non-destructive editing refers to an editing that is virtually carried out by using reproduction route information instead of using the stream data on a disc. Moreover, the technique is also disadvantageous in power consumption.

The present invention is made in light of the problem, and its object is to provide a data recording method that allows reproduction and real-time after-recording in a general MPEG-2 PS/TS decoder, and allows less interruption of reproduction when a non-destructive edit is carried out with respect to an after-recorded result.

DISCLOSURE OF INVENTION

A method, of the present invention, for recording, onto a recording medium, (i) AV data obtained by multiplexing a plurality of sets of stream data in accordance with a predetermined multiplexing rule, and (ii) associated data to be reproduced in synchronism with the AV data, the method includes: (a) a first step of dividing the AV data into partial AV data and of dividing the associated data into partial associated data, in accordance with a predetermined interval; (b) a second step of securing, in the recording medium, a first continuous region for continuously storing a series of the partial AV data and the partial associated data; (c) a third step of continuously recording the partial AV data and the partial associated data onto the first continuous region; and (d) a fourth step of recording, onto the recording medium, file system management information for (i) managing the partial AV data and the partial associated data as different files, and (ii) managing information for handling the partial AV data and the partial associated data as the different files.

With the arrangement, the AV data (e.g., original stream) and the associated data (e.g., after-recorded data), which are to be recorded onto the recording medium, are respectively divided into the sets of the partial AV and the partial associated data by performing the first step. With this, the partial AV data and the partial associated data have such scales (lengths) that ensure the seamless reproduction and the real-time after-recording, respectively.

The partial AV data and the partial associated data thus obtained by the dividing are reproduced in synchronism with each other, and the partial AV data and the partial associated data are continuously recorded by performing the second step and the third step such that they are physically adjacent to each other.

Further, the file system management information recorded in the fourth step manages the partial AV data and the partial associated data as different files. This ensures the real-time after-recording, and allows reproduction with the use of a general MPEG-2 PS decoder whose non-destructive editing property is excellent. Because the partial AV data and the partial associated data are positioned adjacent to each other, the seeking occurs less frequently when the AV data and the associated data are reproduced in synchronism. That is, this provides margin for further synchronized reproduction with other data. For example, the reproduction is less likely to be interrupted even when graphics data is added as well as the after-recorded audio data by way of the non-destructive editing.

The file system management information managing the partial AV data and the partial associated data as different files has the information indicating the correspondence relation between the partial AV data and the partial associated data, which are positioned adjacent to each other in the recording medium. By recording the information indicating the correspondence relation, it is possible to easily recognize respective positions of the continuously stored partial AV data and partial associated data even when the file system management information is not referred. This optimizes the data readout.

The method of the present invention may further include: a fifth step of recording, onto the recording medium, (i) reproduction start time of the partial AV data, and (ii) correspondence information of the partial AV data and the partial associated data, both of which are disposed in the first continuous region.

The arrangement allows easy specification of the position of the partial associated data (after-recording region) corresponding to the partial AV data to be after-recorded.

The method of the present invention may further include: a sixth step of recording, onto the recording medium, information indicating whether or not the partial associated data is recorded adjacent to the corresponding partial AV data.

In cases where defect occurs during the recording of the partial AV data and the partial associated data, the partial associated data being recorded is possibly discarded and the CA is newly recorded onto another region.

To accommodate to such a case, the information managing the partial associated data indicates that no partial associated data is positioned adjacent to the relevant AV data. Therefore, it is possible to easily recognize parts in which the partial AV data and the partial associated data are not continuously recorded, during the non-destructive editing or reproduction of the non-destructively edited result. With this, the user can be notified in advance that the reproduction will be likely to be interrupted during the reproduction of the parts.

Another method for recording, onto a recording medium, (i) AV data obtained by multiplexing a plurality of sets of stream data in accordance with a predetermined multiplexing rule, and (ii) associated data to be reproduced in synchronism with the AV data, the method includes: (a) a seventh step of dividing the AV data into partial AV data in accordance with a predetermined interval; (b) an eighth step of securing, in the recording medium, a first continuous region for continuously storing (i) a series of the partial AV data and (ii) partial reservation data for securing, during recording of the associated data, a region for storing partial associated data that is so divided as to correspond to the partial AV data; (c) a ninth step of continuously recording the partial AV data and the partial reservation data onto the first continuous region, while making sets of the partial reservation data; and (d) a tenth step of recording, onto the recording medium, file system management information for (i) managing the partial AV data and the partial reservation data as different files, and (ii) managing information for handling the partial AV data and the partial reservation data as different files.

With the arrangement, the AV data (e.g., original stream) to be recorded onto the recording medium is divided into partial AV data by performing the seventh step such that the partial AV data has a length (scale) that ensures the seamless reproduction and the real-time after-recording.

The partial AV data thus obtained by the dividing and the partial reservation data are continuously recorded by performing the eighth step and the ninth step such that they are physically positioned adjacent to each other. The partial reservation data secures the region for storing the partial associated data that is to be reproduced in synchronism with the partial AV data.

Further, the file system management information recorded in the tenth step manages the partial AV data and the partial associated data as different files. This ensures the real-time after-recording during the recording of the associated data, and allows reproduction with the use of a general MPEG-2 PS decoder whose non-destructive editing property is excellent.

The method may further include: (a) a eleventh step of dividing, during the recording of the associated data, the associated data into partial associated data in accordance with a predetermined interval; (b) a twelfth step of recording, during the recording of the associated data, the partial associated data onto the region secured by the partial reservation data which is stored in continuity with the partial AV data corresponding to the associated data; (c) a thirteenth step of recording, onto the recording medium during the recording of the associated data, file system management information for (i) managing the partial associated data as a different file from the respective files of the partial AV data and the partial reservation data, (ii) managing information for handling the partial associated data as a different file.

With the arrangement, the partial AV data and the partial associated data are positioned adjacent to each other, so that the seeking occurs less frequently when the AV data and the associated data are reproduced in synchronism. That is, this provides margin for further synchronized reproduction with other data. For example, the reproduction is less likely to be interrupted even when graphics data is added as well as the after-recorded audio data by way of the non-destructive editing.

The file system management information managing the partial AV data and the partial associated data as different files has the information indicating the correspondence relation between the partial AV data and the partial associated data, which are positioned adjacent to each other in the recording medium. By recording the information indicating the correspondence relation, it is possible to easily recognize respective positions of the continuously stored partial AV data and partial associated data even when no reference to the file system management information is made. This optimizes the data readout.

Additional objects, features, and strengths of the present invention will be made clear by the description below. Further, the advantages of the present invention will be evident from the following explanation in reference to the drawings.

BRIEF DESCRIPTION OF DRAWINGS

FIG. 1(*a*) illustrates respective data structures of an original stream file and an after-recording data file. FIG. 1(*b*) illustrates respective positions, in a disc, of data of the original stream file and the after-recording data file.

FIG. 3(*b*) illustrates relation among sets of management information of the directory/file structure in the UDF.

FIG. 9 illustrates a structure of a stream management information file in Embodiment 1 of the present invention.

FIG. 10(*a*) and FIG. 10(*b*) each illustrate a structure of video_unit_table in Embodiment 1 of the present invention.

FIG. 11(*a*) and FIG. 11(*b*) each illustrate a structure of VU_flags in Embodiment 1 of the present invention.

FIG. 12(*a*) and FIG. 12(*b*) each illustrate a structure of continuous_area_table in Embodiment 1 of the present invention.

FIG. 13(*a*) and FIG. 13(*b*) illustrate a structure of CA_flags in Embodiment 1 of the present invention.

FIG. 14 illustrates a structure of a program information file in Embodiment 1 of the present invention.

FIG. 15(*a*) and FIG. 15(*b*) illustrate a structure of scene_table in Embodiment 1 of the present invention.

FIG. 19(*a*) illustrates respective data structures of two kinds of stream files in Embodiment 2 of the present invention. FIG. 19(*b*) illustrates how respective data in the stream files is positioned in a disc.

FIG. 20(*a*) illustrates a data structure of a stream file. FIG. 20(*b*) illustrates how data in the stream file is positioned in a disc.

FIG. 22(*a*) illustrates respective data structures of an original stream file and an after-recording region reservation file in Embodiment 3 of the present invention. FIG. 22(*b*) illustrates how respective data of the original stream file and the after-recording region reservation file are positioned in the disc just after picture recording.

FIG. 23(*b*) illustrates how the graphics file, the after-recording data file, and the original stream file, and the after-recording region reservation file are positioned in the disc just after the after-recording and non-destructive editing.

FIG. 24 illustrates a structure of a program information file in Embodiment 3 of the present invention.

FIG. 25(*a*) and FIG. 25(*b*) illustrate subaudio_table in Embodiment 3 of the present invention.

FIG. 26(*a*) and FIG. 26(*b*) illustrate graphics_table in Embodiment 3 of the present invention.

FIG. 27(*a*) and FIG. 27(*b*) illustrate SA_flags and gr_flags in Embodiment 3 of the present invention.

FIG. 29(*a*) illustrates respective data structures of an original stream file and an after-recording data file in Embodiment 4 of the present invention. FIG. 29(*b*) illustrates how respective data in the original stream file and the after-recording data file are positioned in the disc.

BEST MODE FOR CARRYING OUT THE INVENTION

The following description deals with detailed description of Embodiments of the present invention with reference to figures. Firstly explained here is a structure commonly used in the present invention, and subsequently explained are unique things in respective Embodiments. Note that the present invention is not limited to these.

<System Structure>

Figure 2:
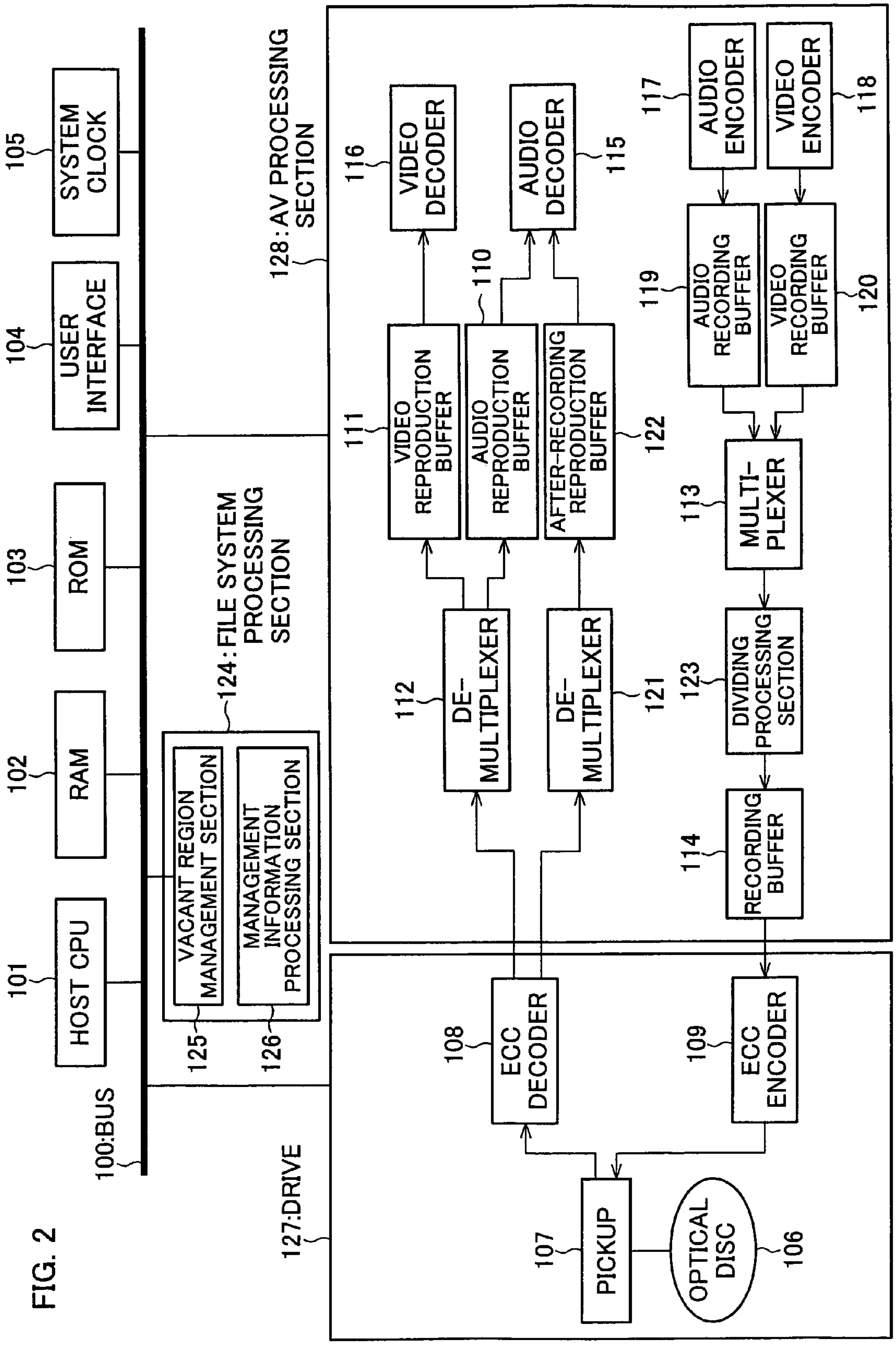
FIG. 2 is a block diagram schematically illustrating a structure of a video disc recorder according to embodiments of the present invention.

FIG. 2 is a block diagram illustrating a basic system of a video disc recorder that is common in Embodiments described below.

As shown in FIG. 2, the video disc recorder includes: a bus 100, a host CPU 101, a RAM 102, a ROM 103, a user interface 104, a system clock 105, an optical disc 106, a pickup 107, an ECC (Error Correcting Coding) decoder 108, an ECC encoder 109, an audio reproduction buffer 110, a video reproduction buffer 111, a de-multiplexer 112, a multiplexer 113, a recording buffer 114, an audio decoder 115, a video decoder 116, an audio encoder 117, a video encoder 118, an audio recording buffer 119, a video recording buffer 120, a de-multiplexer 121, an after-recording data reproduction buffer 122, a dividing processing section 123 (means for dividing into AV data and partial associated data), a vacant region management section 125 (means for securing a continuous region), a management information processing section 126, a camera (not shown), a microphone (not shown), a speaker (not shown), a display (not shown), and the like. The pickup 107, the ECC decoder 108, and the ECC encoder 109 constitute a drive 127 (means for continuously recording partial AV data and the partial associated data; means for recording file system management information onto the recording medium).

The host CPU 101 controls, via the bus 100, the de-multiplexer 112, the multiplexer 113, the pickup 107, the audio decoder 115, the video decoder 116, the audio encoder 117, and the video encoder 118.

During reproduction, data read out from the optical disc 106 via the pickup 107 is subjected to an error correction carried out by the ECC decoder 108. In the data thus subjected to the error correction, file system management information is processed by the management information processing section 126. Then, the data is sent to the de-multiplexer 112 or de-multiplexer 121.

According to an instruction from the host CPU 101, the de-multiplexer 112 sends audio data of the readout data to the audio reproduction buffer 110, and sends video data thereof to the video reproduction buffer 111. Likewise, the de-multiplexer 121 sends the readout data to the after-recording data reproduction buffer 122 in accordance with an instruction from the host CPU 101.

The audio decoder 115 reads out the data from the audio reproduction buffer 110 and the after-recording data reproduction buffer 122, and carries out decoding with respect to the readout data, in accordance with an instruction from the host CPU 101. Likewise, the video decoder 116 reads out the data from the video reproduction buffer 111, and carries out decoding with respect to the readout data, in accordance with an instruction from the host CPU 101.

On the other hand, during recording, data compressed and encoded by the audio encoder 117 is sent to the audio recording buffer 119, and data compressed and encoded by the video encoder 118 is sent to the video recording buffer 120. According to an instruction from the host CPU 101, the multiplexer 113 reads out the respective data from the audio recording buffer 119 and the video recording buffer 120, and carries out AV-multiplexing with respect to the readout data, and sends the AV-multiplexed data to the dividing processing section 123. The dividing processing section 123 divides the AV-multiplexed data at every predetermined interval, and sends the divided data to the recording buffer 114. On this occasion, the vacant region management section 125 secures a continuous region for the recording of the data, and the ECC encoder 109 adds an error correction code to the AV-multiplexed data read out from the recording buffer 114, and the pickup 107 records the data onto the secured continuous region in the optical disc 106.

An encoding format of the audio data is MPEG-1 Layer-II defined by ISO/IEC 13818-3, and an encoding format of the video data is MPEG-2 defined by ISO/IEC13818-2. The optical disc 106 is a re-writable optical disc, such as DVD-RAM, in which 2048 byte is handled as one sector and in which 16 sectors constitute an ECC block for the sake of the error correction.

<File System>

Figure 3:
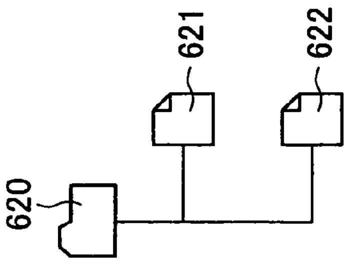
FIG. 3(*a*) illustrates a directory/file structure.
Figure 3:
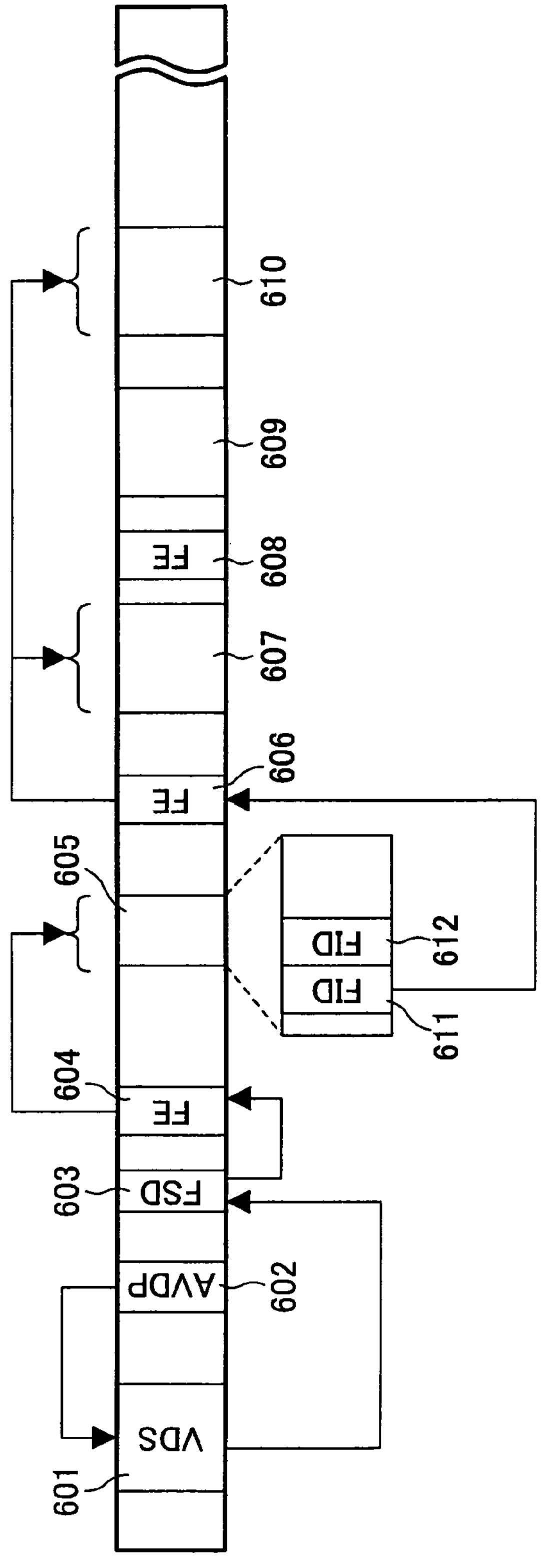

The following explains a UDF (Universal Disk Format) adopted as a format of a file system used in the description of the present invention, with reference to FIG. 3(*a*) and FIG. 3(*b*). FIG. 3(*a*) illustrates a directory/file structure, and FIG. 3(*b*) illustrates an example in which the directory/file structure is recorded in compliance with the UDF.

An AVDP (Anchor Volume Descriptor Pointer) 602 shown in FIG. 3(*b*) corresponds to an entry point for a search for management information of the UDF, and is usually recorded in a 256-th sector, an N-th sector, or an (N-256)-th sector (N refers to a maximum logical sector number). A VDS (Volume Descriptor Sequence) 601 stores management information about a volume. The volume is a region managed by the UDF, and one volume generally exists in one disc, and generally includes one partition. One FSD (File Set Descriptor) 603 exists in the partition. Position information in the partition is indicated by a logic block number that corresponds to a sector number counted from top of the partition. Note that one logic block corresponds to one sector. Note also that each partition (not shown) includes a table indicating whether or not a logic block termed "space bitmap" has been allocated to each file.

The FSD 603 includes position information of an FE 604 serving as a file entry (FE) of a root directory. The position information is referred to as "extent" including logic block numbers and the number of the logic blocks. The FE manages an aggregate of the extents. By rewriting, adding, and/or deleting each extent, it is possible for the FE to change order of sets of actual data constituting the file, and/or to carry out data insertion and data deletion.

The FE 604 manages a region 605 storing an aggregate of file identifier descriptors (FIDs), each of which stores name(s) of a file and/or a directory just below the root directory. An FID 611 and an FID 612 in the region 605 include position information of FE 606 and FE 608, respectively. The FE 606 manages a filename of a file 621 and an aggregation of extents thereof, and the FE 608 manages a filename of a file 622 and an aggregation of extents thereof. Specifically, the FE 606 manages, as the extents, a region 607 and a region 610, each of which is a region constituting the actual data of the file 621. An access to the actual data of the file 621 can be made by following the links in order of the AVDP 602, the VDS 601, the FSD 603, the FE 604, the FID 611, the FE 606, the region 607, and the region 610.

Embodiment 1

Embodiment 1 of the present invention will be explained below with reference to FIG. 1, and FIG. 4 through FIG. 18.

<File/Directory Structure>

Figure 4:
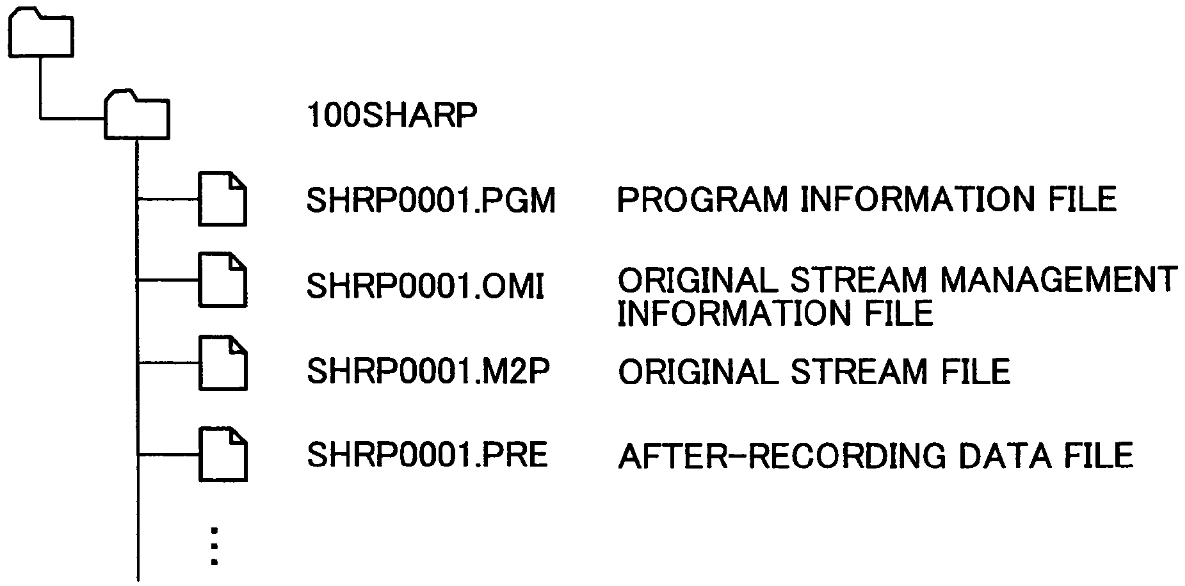
FIG. 4 illustrates a file/directory structure in Embodiment 1 of the present invention.

A file/directory structure according to Embodiment 1 is explained with reference to FIG. 4. As shown in FIG. 4, data of Embodiment 1 is stored in five types of files.

An original stream file (SHRP0001.M2P) is a file prepared per picture recording, and is in compliance with the MPEG-2 PS (Program Stream) format. An after-recording data file (SHRP0001.PRE) is a file for (i) securing a region for after-recording, and (ii) storing after-recorded data. An original stream management information file (SHRP0001.OMI) is a file for storing (i) time-address correspondence information about the original stream file; (ii) attribution information about the original stream file; (iii) attribution information about the after-recording data file; and (iv) information indicative of a correspondence correlation with the original stream file. The original stream management information file is provided per original stream file. A program information file (SHRP0001 .PGM) is a file for storing information that specifies which parts in the stream or the data are to be reproduced and that specifies order of reproducing these parts. Note that the program corresponds to one of contents, and is a target to be reproduced in response to user's instruction.

The four files above are newly prepared during a picture recording. The files have different extensions, but are arranged so that others are in common than the extensions for the purpose of clarifying a relation among the files. During audio after-recording, after-recorded audio data is overwritten in a predetermined location of the after-recording data file, and the after-recording data management information file reflects the overwriting. Moreover, the program information file is also changed so that the added after-recorded audio data is also a target to be reproduced.

During the non-destructive editing, the program information file is newly prepared, and stores one by one (i) filenames of the original stream management information file and/or the after-recording data management information file, each of which manages the data to be reproduced; and (ii) the parts of the data which the user wishes to reproduce. Note that respective data structures of the files will be explained later.

<A Structure of an AV Stream>

Figure 5:
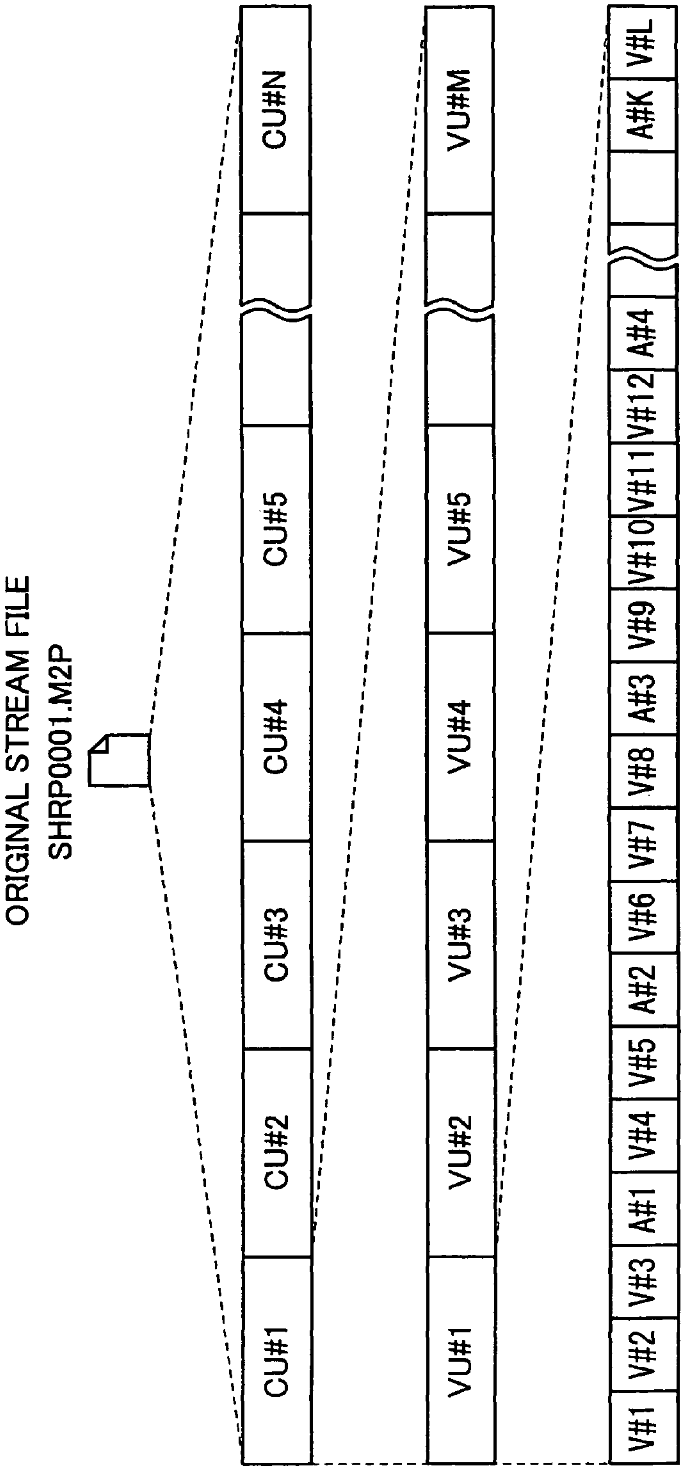
FIG. 5(*a*) through FIG. 5(*c*) each illustrate a structure of an original stream file in Embodiment 1 of the present invention.

The following description explains a structure of an AV stream in Embodiment 1 with reference to FIG. 5.

Firstly, the original stream file is explained with reference to FIG. 5. Content of the original stream file is in compliance with the MPEG-2 PS format, and is constituted by the integral number of continuous units (CUs) as shown in FIG. 5(*a*). Each CU is a recording unit by which the recording is carried out with respect to a disc. Length of the CU is so set as to ensure (i) seamless reproduction (reproduction during which an image and a sound are never interrupted) and (ii) real-time after-recording (audio recording carried out during a seamless reproduction of video to be subjected to the after-recording), irrespective of how the CUs constituting the AV stream are provided on the disc. A method for setting the length will be described later.

Each CU is constituted by the integral number of video units (VUs) as shown in FIG. 5(*b*). Each VU is a individually reproducible unit, and can be an entry point during a reproduction. The VU is constituted by the integral number of audio packs (A#1 through A#K) and video packs (V#1 through V#L). The audio packs and the video packs are so AV-multiplexed as to maintain an MPEG-2 PS compatible decoder model. A size of each pack is as large as a sector size such that excess data is not read out during readout of the disc. Note that the video data to be packed is constituted by one or two GOPs (Groups of picture). Note also that the audio data to be packed is constituted by the integral number of AAUs (Audio Access Units).

Note that the GOP is a unit of image compression of the MPEG-2 video standard, and is constituted by a plurality of video frames (typically, 15 frames or so). The AAU is a unit of audio compression of the MPEG-1 Layer-II standard, and is constituted by 1152 sound waveform sample points. In cases where a sampling frequency is 48 kHz, reproduction time per AAU is 0.024 second. Further, a sequence header (SH) is provided at a head of video data in each VU such that individual reproductions are carried out in the VU unit.

Note that a VU at the end of the CU is padded by a pack storing a padding packet such that the CU is constituted by the integral number of ECC blocks.

<After-Recording Data File>

Figure 6:
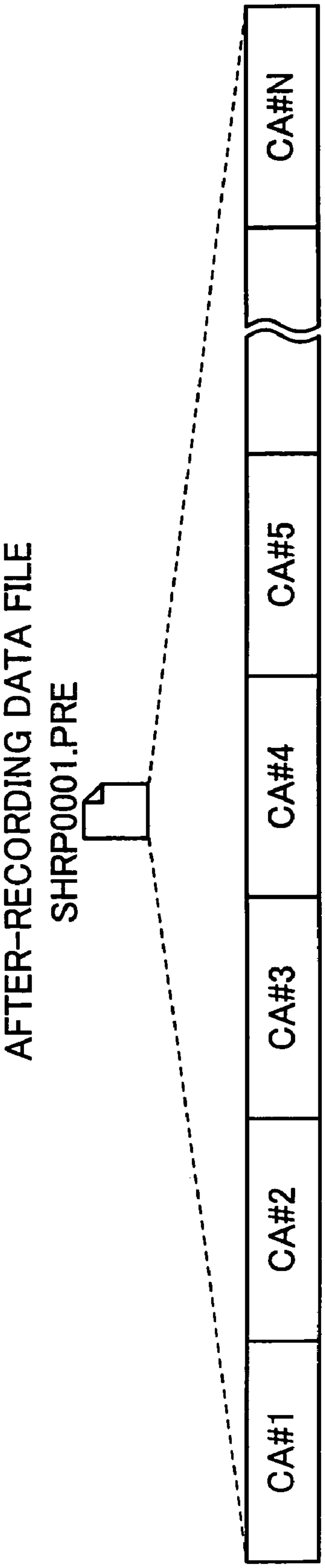
FIG. 6 is an explanatory diagram illustrating a structure of an after-recording data file in Embodiment 1 of the present invention.

The following explains a structure of the after-recording data file with reference to FIG. 6. As shown in FIG. 6, the after-recording data file is constituted by the integral number of continuous areas (CAs). One CA corresponds to one CU in the original stream file, and stores after-recording data corresponding to the reproduction data of the corresponding CU. For example, a CA#n stores after-recording audio data that is to be reproduced in synchronization with a CU#n of the original stream file. The CA is constituted by the integral number of ECC block(s).

The after-recording data file is in compliance with the MPEG-2 PS format as the original stream file is. During initial picture recording, padding packets are recorded onto the after-recording data file. After the after-recording, packs containing the after-recorded data are overwritten in the after-recording data file. The packs to be overwritten have SCRs (System Clock References) in pack headers and have PTSs (Presentation Time Stamps) in packet headers, respectively. The SCRs and the PTSs suit to SCRs and PTSs of the corresponding audio packs in the original stream file, respectively. With this, the audio data of the original stream can be easily replaced with the after-recorded data by overwriting the audio packs of the CU with the corresponding audio packs of the CA.

<Layout in the Disc>

Figure 1:
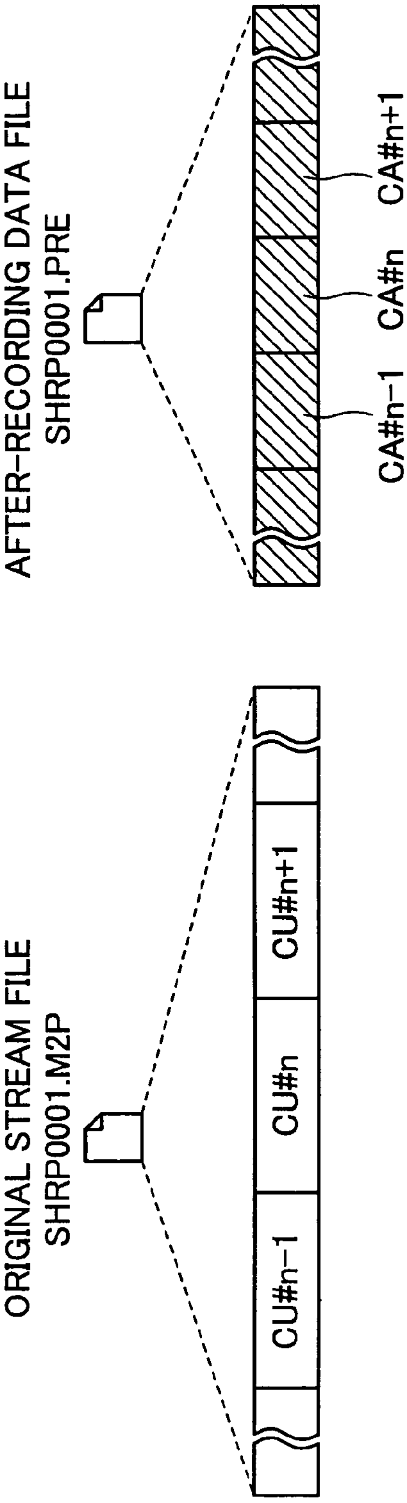
FIG. 1(*a*) and FIG. 1(*b*) illustrates an embodiment of the present invention.
Figure 1:
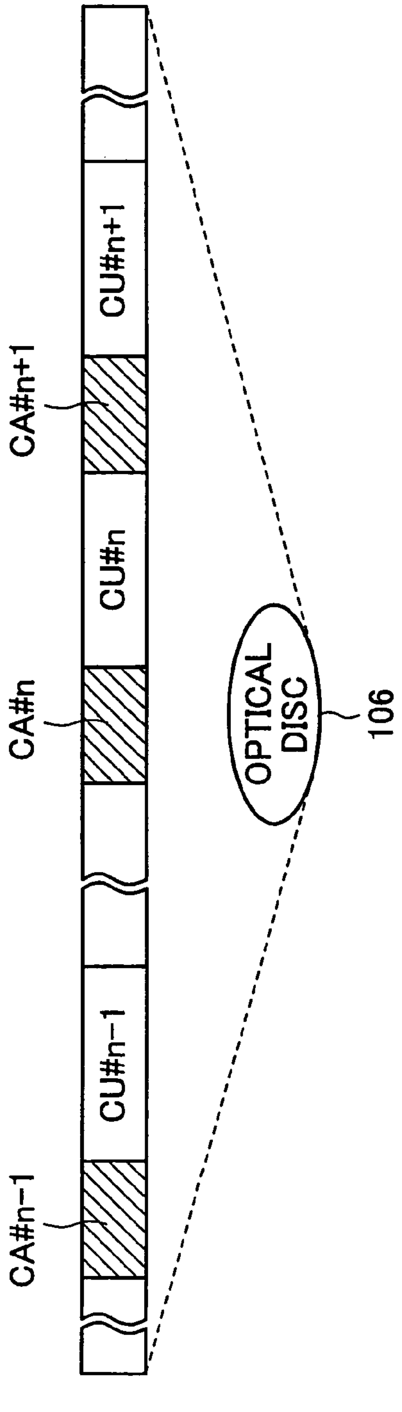

The following description explains how respective data of the original stream file and the after-recording data file are disposed in the disc with reference to FIGS. 1(*a*) and (*b*). FIG. 1(*a*) illustrates the original stream file (SHRP0001.M2P) and the after-recording data file (SRP0001.PRE), which correspond to each other. The original stream file and the after-recording data file are recorded onto the optical disc 106 such that the CAs come just before the corresponding CUs, respectively (see FIG. 1(*b*)).

With this, the data (each CA and each CU) to be reproduced in synchronism are positioned adjacent to each other on the disc. This minimizes a movement of the pickup during reproduction. Accordingly, the interruption is less likely to occur during reproduction of a non-destructively edited result as described below. Because such a small CA in size is so positioned as to be read out prior to the CU, less buffer memory amount can be used for the synchronized reproduction.

<Method for Determining a CU Scale>

A method for determining reproduction time of the CU will be explained with reference to FIG. 7 and FIG. 8. In the method, the reproduction time of the CU is determined such that the seamless reproduction is maintained when the after-recording is carried out by using, for sake of ensuring compatibility between devices, (i) a reference device (reference device model); and (ii) a reference after-recording algorism.

Figure 7:
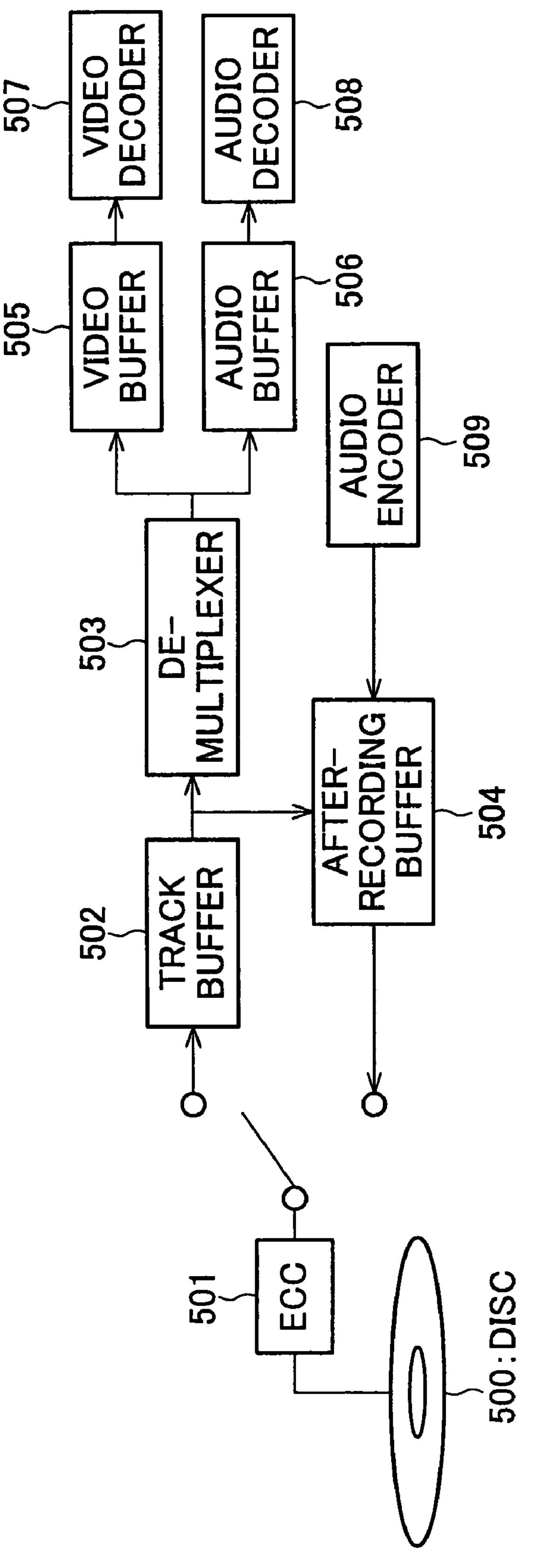
FIG. 7 illustrates a reference device model in Embodiment 1 of the present invention.
Figure 8:
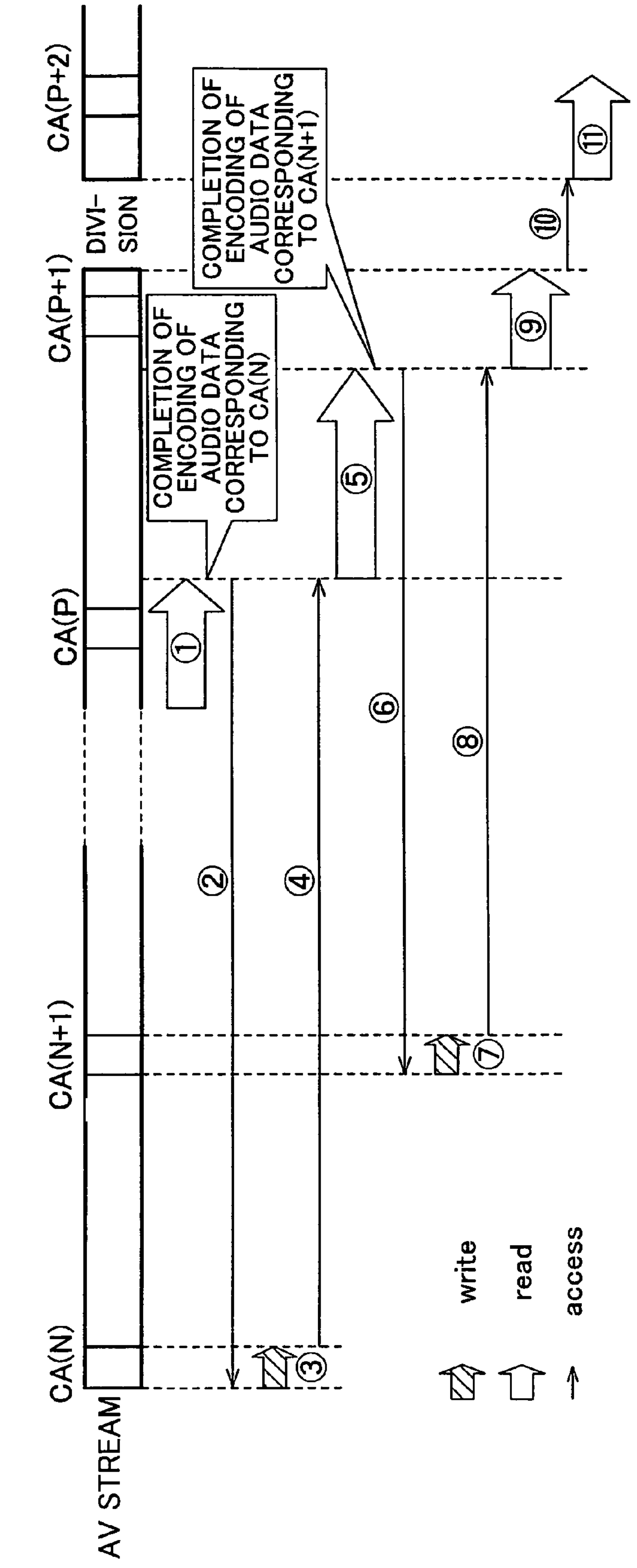
FIG. 8 illustrates a reference after-recording algorism in Embodiment 1 of the present invention.

Firstly explained is the reference device model with reference to FIG. 7. The reference device model is made up of a pickup (not shown); an ECC encoder/decoder 501 connected to the pickup; a track buffer 502; a de-multiplexer 503; an after-recording buffer 504; an audio encoder 509; a video buffer 505; an audio buffer 506; a video decoder 507; and an audio decoder 508.

Because the reference device model has the single pickup, readout of reproduction data from a disc 500 and recording of after-recorded data onto the disc 500 are carried out in a time-sharing manner. The reproduction data is read out from the disc 500 together with the CA. An ECC block (CA block) including the readout CA is sent from the track buffer 502 to the after-recording buffer 504.

The audio encoder 509 sends the after-recorded data to the after-recording buffer 504 in a cycle of the AUU. The output data is overwritten in the corresponding CA block in the after-recording buffer 504. The CA block is recorded onto a predetermined ECC block, with the result that the after-recorded data is recorded.

Here, it is assumed that Rs indicates both (i) a transmission speed of the audio frame data to the. ECC encoder 501, and (ii) a transmission speed of the audio frame data from the ECC decoder 501. It is further assumed that Ta indicates a maximum period during which the readout and the recording are suspended via an access. Note that the period Ta includes seeking time, rotation latency time, and time required for completing of outputting, from the ECC decoder 501, of the data initially read out after the access. Embodiment 1 assumes that Rs is 20 Mbps and Ta is one second.

Next, the reference after-recording algorithm will be explained with reference to FIG. 8. Note that numbers (① to ⑥ in FIG. 8 respectively correspond to the following numbers ① to ⑥ which describe the algorithm briefly as follows:

① Read out data for reproduction.
② Make an access to a CA(N), which is an n-th CA, concurrently with completion of encoding of audio data that corresponds to the CA(N).
③ Recording the CA(N) onto the disc.
④ Go back to the readout position where the pickup was.
⑤ Read out the data for reproduction.
⑥ Make an access to a CA(N+1), which is an (n+1)-th CA, concurrently with completion of encoding of audio data that corresponds to the CA(N+1).

After that, operations ③ through ⑥ are repeated.

The after-recording, using the reference after-recording algorithm in the reference device model, ensures that the after-recording buffer 504 is free from overflow and that the track buffer 502 is free from underflow, as long as the following condition is satisfied:

$$Te(i) \geqq Tr(i)+Tw(i) \quad (1)$$

where Te(i) indicates maximum reproduction time of a CU#i that is an arbitrary CU in the AV stream; Tr(i) indicates maximum readout time including a division jump; and Tw(i) indicates maximum time for recording a CA#i that corresponds to the CU#.

This is because Formula (1) satisfies a sufficient condition of the seamless reproduction. The condition is represented by the following Formula (2):

$$\sum_i Te(i) \geqq \sum_i (Tr(i)+Tw(i)) \quad (2)$$

where Ta indicates maximum round-trip time for the pickup to go to and return from the CA in the disc.

Because the after-recorded data is recorded onto the disc in synchronization with the completion of the encoding of the CA, data never keeps being accumulated in the after-recording buffer 504 and the after-recording buffer 504 is therefore free from the overflow.

Tr(i) in Formula (1) satisfies the following Formula (3):

$$Tr(i)=Te(i)\times Ro/Rs+Te(i)\times Ra/Rs+Ta \quad (3)$$

where Ro indicates maximum bit rate of the original stream, Ra indicates maximum bit rate of the after-recording audio stream, and Rs indicates input speed and output speed of the audio frame data, i.e., indicates audio bit rate.

A first term in a right side of Formula (3) indicates time for reading out a VU in a CU, and a second term therein indicates time for reading out the CA, and a third term therein indicates time for an access made by the division jump associated with the readouts. The division jump is carried out once at the maximum during the readout of the CU, so that Formula (3), i.e., Tr(i) indicates time corresponding to one access operation.

Tw(i) satisfies the following Formula (4):

$$Tw(i)=2Ta+Te(i)\times Ra/RS \quad (4)$$

Here, a first term in a right side of Formula (4) indicates access time (forward-backward access time) for the pickup to go to and come back from the CA. The maximum access time Ta is used to represent the forward-backward access time because each CA can be recorded onto any position in the disc. Specifically, there is such a possibility that a CU which is being read out is positioned in an innermost side of the disc, and that a CA to be recorded is positioned in an outermost side of the disc. For this reason, the forward-backward access time is required to be estimated at the maximum value.

Note that the CA is recorded continuously onto the disc as described above, so that no access is made during the recording of the CA. This shortens time required for the recording of the CA, with the result that a lower limit value of the reproduction time of the CU can be restrained to be low.

When Formula (3) and Formula (4) are substituted in Formula (1) to solve for Te(i), a condition of Te(i) that ensures the real-time after-recording can be obtained as the following Formula (5):

$$Te(i) \geqq (3Ta\times Rs)/(Rs-Ro-2Ra) \quad (5)$$

Indicated by Rv is input speed and output speed of the video frame data, i.e., is video bit rate.

Accordingly, the CU reproduction time lower limit value Temin that ensures the after-recording is represented by the following formula (6):

$$Temin=(3Ta\times Rs)/(Rs-Ro-2Ra) \quad (6)$$

A CU reproduction time upper limit value Temax is so set as to satisfy the following Formula (7):

$$Temax=(3Ta\times Rs)/(Rs-Ro-2Ra)+Tvmax \quad (7)$$

where Tvmax indicates maximum reproduction time of the VU.

The setting of the upper limitation value of the CU reproduction time is carried out so as to allow for estimation of maximum amount of the retardation memory required for the synchronized reproduction of the after-recorded audio and the normal audio, and so as to ensure reproduction compatibility. Note that, in Embodiment 1, the multiplexing interval lower limit value Temin is set according to the audio bit rate Ra and the video bit rate Rv; however, the lower limit value may be constant at any value as long as the lower limit value is based on maximum bit rate.

Moreover, reproduction time of the VU in the stream may be constant or variable as long as the reproduction time of the CU meets the aforementioned restriction.

Further, Embodiment 1 assumes that the division jump and the movement of the pickup to a previous CU are asynchronously carried out. A reason for this is as follows. That is, a condition for the real-time after-recording is stricter (the readout of the reproduction data is interrupted for a longer period of time) in cases where the division jump and the movement are asynchronously carried out, as compared with cases where the division jump and the movement are synchronously carried out. In other words, in cases where the real-time recording is attained when the division jump and the movement are asynchronously carried out, the real-time recording is accordingly attained when the division jump and the movement are synchronously carried out. This allows an increase in freedom of implementation of the present invention.

Therefore, Temin may be set on an assumption that the division jump and the movement of the pickup to the previous CU are carried out in synchronism. In this case, the second term in the right side of Formula 3 is omitted.

<Formats of Management Information Files>

The following description explains management information file formats according to the present invention with reference to FIG. 9 through FIG. 15.

Firstly explained is the original stream management information file. As shown in FIG. 9, the original stream management information file is made up of (i) o_attribute( ) for storing attribution information about the entire original stream file managed by the original stream management information file; (ii) video_unit_table( ) for storing information about the VU; (iii) p_attribute( ) for storing attribution information about the entire after-recording data file managed by the original stream management information file; and (iv) continuous_area_table( ) for storing information about the CA.

As shown in FIG. 10(*a*), the video_unit_table( ) is made up of (i) number_of_video_unit for indicating the number of the VUs; and (ii) video_unit_info( ) for storing information about each of the VUs.

As shown in FIG. 10(*b*), the video_unit_info( )is made up of (i) VU_flags for indicating various kinds of attribution information about a predetermined VU; (ii) VU_PTS for storing a PTS (Presentation Time Stamp) of a top display frame of a predetermined VU; and (iii) VU_PN for indicating relative pack numbers counted from a top of the file. The VU_PTS and the VU_PN make it possible to specify a position of a VU corresponding to a specific PTS. Namely, the VU_PTS indicates reproduction start time of the original stream (AV data).

As shown in FIG. 11(*a*), the VU_flags( ) includes first_unit_flag. The first_unit_flag is 1-bit information. As shown in FIG. 11(*b*), the first_unit_flag indicative of 0 b means that a managed VU is not positioned in the head of the CU, whereas the first_unit_flag indicative of 1 b means that a managed VU is positioned in the head of the CU.

As shown in FIG. 12(*a*), the continuous_area_table( ) is made up of (i) number_of_continuous_area for indicating the number of the CAs; and (ii) continuous_area_info( ) for storing information about each of the CAs.

As shown in FIG. 12(*b*), the continuous_area_info( )is made up of (i) CA_flags for indicating various kinds of attribution information about a predetermined CA; (ii) CA_PTS for storing a PTS (Presentation Time Stamp) of a top display frame of a CU corresponding to the CA; and (iii) CA_PN for indicating relative pack numbers counted from a top of the file. The CA_PTS and the CA_PN make it possible to specify a position of a CA corresponding to a specific PTS in the original stream. The CA PN indicates position information of a first continuous region for recording the CA and the CU, in other words, the CA_PN indicates head position information of the CA.

As shown in FIG. 13(*a*), the CA_flags( ) includes "placement flag". The placement_flag is 1-bit information. As shown in FIG. 13(*b*), the placement_flag indicative of 0 b means that a managed CA is not positioned just before a corresponding CU (that is to be reproduced in synchronism with the CA), whereas the placement_flag indicative of 1 b means that a managed CA is positioned just before a corresponding CU (that is to be reproduced in synchronism with the CA).

Making reference to the flag allows for realization whether or not the non-destructively edited result possibly cause the interruption during the reproduction. Specifically, seeking of the CA is carried out when the placement_flag is indicative of 0 b. This notifies that the reproduction is highly likely to be interrupted.

Note that explanation of the o_attribute( ) and the p_attribute( ) is omitted.

Finally explained is the program information file. As shown in FIG. 14, the program information file is made up of (i) pg_attribute( ) for storing attribution information of entire program information; and (ii) scene_table( ) for storing information about scenes constituting the program.

As shown in FIG. 15(*a*), the scene_table( ) is made up of (i) number_of_scene for storing the number of the scenes; and (ii) scene_info( ) for storing information about each of the scenes. As shown in FIG. 15(*b*), the scene_info( ) is made up of (i) sc_filename for storing a filename of the original stream management information file that manages the original stream file containing a predetermined scene; (ii) sc_start_PTS for storing information indicating a position from which the scene is reproduced; and (iii) sc_duration for storing reproduction time of the scene.

<Processes During Recording>

Figure 16:
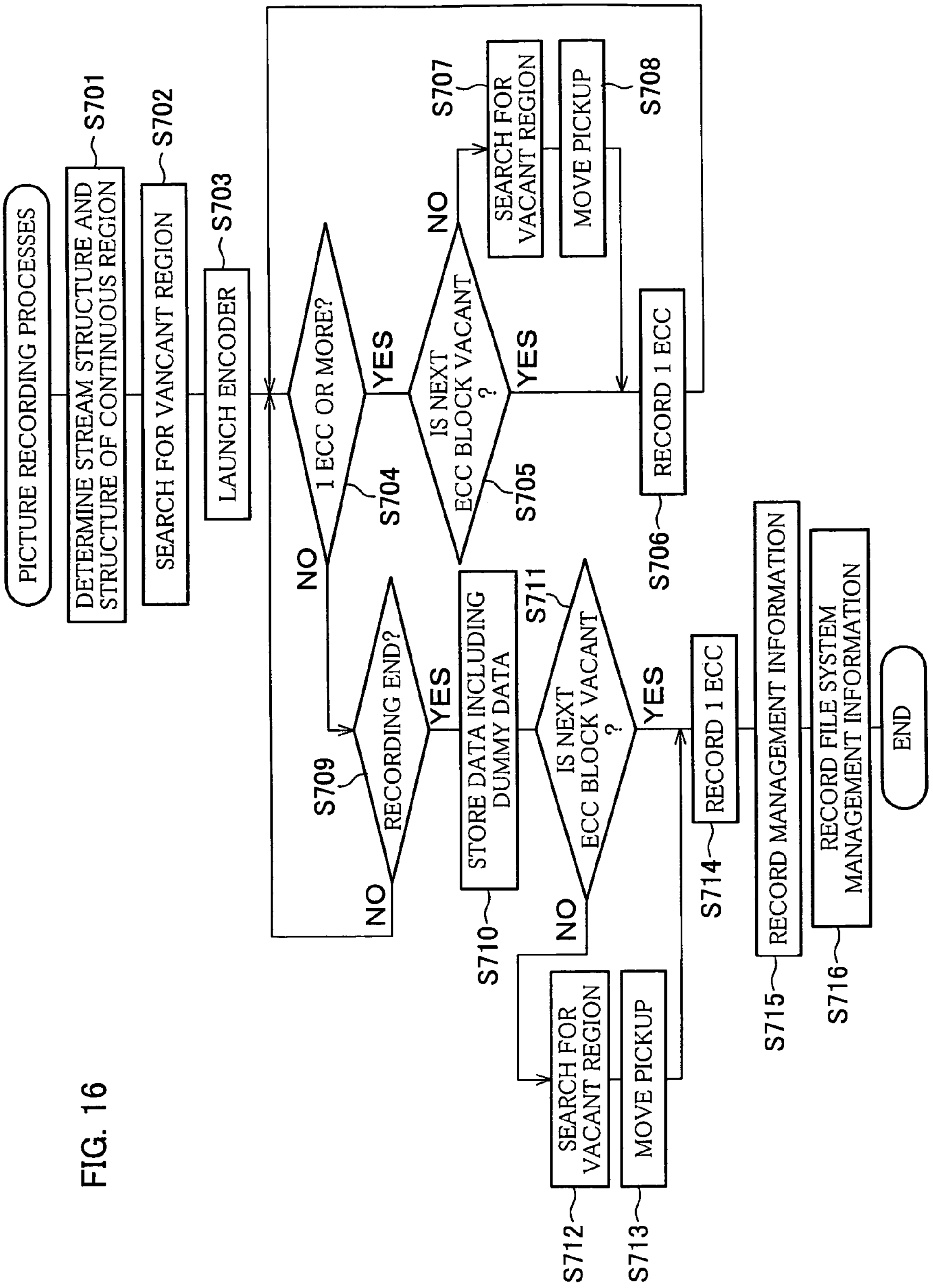
FIG. 16 is a flowchart illustrating a flow of recording processes in Embodiment 1 of the present invention.

The following explains processes performed in response to the user's instruction for picture recording, with reference to a flowchart of FIG. 16. Note that an AV stream to be recorded on this occasion has a bit rate Ro of 12 Mbps, and has an audio bit rate Ra of 256 kbps, and is such a stream that is in compliance with the constant VU reproduction time method. Note also that, the following assumes that the management information of the file system has already been in the RAM.

Firstly carried out is determination of a stream structure and a structure of the continuous region (S701). When each VU is constituted by one GOP made up of 15 frames, substituted in Formula (6) and Formula (7) are the following conditions: Rs=20 Mbps, Ta=1 second, Rv=12 Mbps, Ra=256 kbps, and Tvmax=approximately 0.5 second. With this, Te(i) falls within a range from 3 seconds to 4 seconds. When Tvmax is approximately 0.5 second, Te(i) satisfying this condition is 3 seconds. In this case, each CA is inserted in the AV stream for every 6 VUs.

A region size for the CA in this case is determined in consideration of a pack header and a packet header, both of which are attached to the audio data corresponding to 3 seconds. The above process in S701 corresponds to a first step of dividing, according to the predetermined interval, the original stream serving as the AV data into the partial AV data (CU, i.e., 6 VUs), and dividing, according to the predetermined interval, the after-recorded data serving as the associated data of the AV data into the partial associated data.

Then, a search is carried out for a vacant region capable of continuous storage of the 6 VUs and one CA, with reference to the Space Bitmap in the RAM 102. When no vacant region is found, the picture recording is stopped, and the user is notified that the recording cannot be carried out (S702).

Next, the audio encoder 117 and the video encoder 118 are launched (S703). After that, a check is carried out whether or not data corresponding to one ECC block (32 KB) or greater is accumulated in the recording buffer (S704). While the data is being accumulated, processes S705 to S708 are repeated.

Specifically, when data corresponding to one ECC block or greater is accumulated in the recording buffer, a search in the disc is carried out for a next vacant ECC block for storing the data, with reference to the Space Bitmap in the RAM (S705). Carried out when vacancy is found is the recording, onto the disc, of the data that corresponds to one ECC block and that is accumulated in the recording buffer 111 (S706). When no vacancy is found, a search is carried out for a continuous vacant region that can store the nine VUs and the CA (S707). Then, the pickup is moved to the head of the vacant region found by the search (S708). Carried out after that is the recording, onto the disc, of the data that corresponds to one ECC block and that is accumulated in the recording buffer 111 (S706).

The process in S704 corresponds to a second step of securing a first continuous region for continuously storing the partial AV data and the partial associated data. Moreover, the process in S706 corresponds to a third step of continuously recording the partial AV data and the partial associated data onto the first continuous region.

Meanwhile, when data accumulated in the recording buffer 111 is less than data corresponding to one ECC block, a check is carried out whether or not an instruction for finishing the recording has been made (S709). When such an instruction has not been made, the sequence goes to S704.

On the other hand, when such an instruction has been made in S709, the following processes are carried out. That is, dummy data is provided at an end of the data that is accumulated in the recording buffer and that is less than 32 KB, so as to cause the accumulated data to have 32 KB (S710). Next, the data thus having 32 KB is recorded onto the disc (S711 through S714). Note that processes in S711 through S714 are the same as the processes in S705 through S708, respectively.

Carried out next is recording of (i) the management information about the original stream onto the original stream management information file; and of (ii) the management information about the after-recorded data, onto the after-recording data management information file (S715). Then, the file system management information is recorded onto the optical disc 106 (S716). Note that the file system management information thus recorded designates such that the CU and the CA are handled as different files.

The process in S716 corresponds to a forth step of (i) recording, onto the recording medium, the file system management information for (i) managing the partial AV data and the partial associated data as different files, (ii) managing information for handling the partial AV data and the partial associated data as files different from a file for securing the first continuous region.

The process in S715 corresponds to a fifth step of recording, onto the recording medium, (i) the reproduction start time of the partial AV data, and (ii) the correspondence information of the partial AV data and the partial associated data, both of which are disposed in the first continuous region.

The following explains operations of the audio encoder 117, the video encoder 118, and the multiplexer 113 during the processes. Results obtained by encoding carried out by these encoders are sent to the audio recording buffer 119 and the video recording buffer 120, respectively. The multiplexer 113 multiplexes the respective sets of data into MPEG-2 PS data, and then the MPEG-2 PS data is stored in the recording buffer 114.

In cases where the recording buffer 114 receives a data corresponding to one VU and where the VU is 9×i-th VU (i is an integer equal to or larger than 0), a CA having the aforesaid size is firstly sent to the recording buffer 111.

When the completion of the encoding of the data corresponding to the VU is notified to the host CPU 101, the host CPU 101 updates (i) the management information, in the RAM 102, about the original stream; and (ii) the management information, in the RAM 102, about the after-recorded data. The update is carried out in accordance with the PTS at the head of the VU, the number of packs constituting the VU, and the number of packs constituting the CA.

[Processes During Reproduction]

Figure 17:
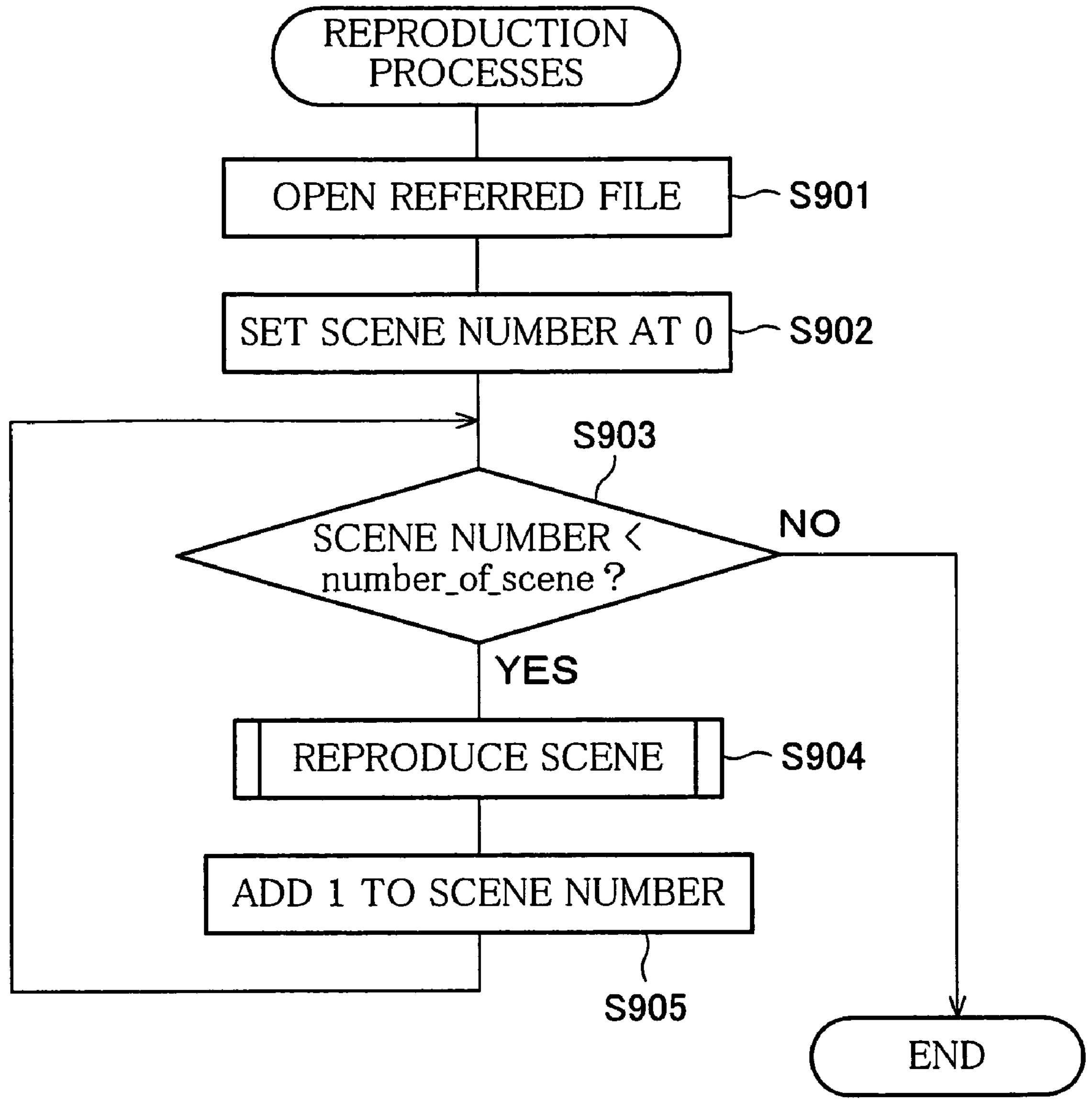
FIG. 17 is a flowchart illustrating a flow of reproduction processes in Embodiment 1 of the present invention.

The following description explains processes when the user instructs reproduction of the program to which the after-recording was carried out, with reference to a flowchart of FIG. 17. Note that the following description assumes that the program information file used in the reproduction has already been in the RAM 102.

Firstly, carried out in reference to the sc_filename of the scene_info( ) in the program information file is opening of the original stream file and the after-recording data file, each of which is referred by the program. Simultaneously, the original stream management information file managing these files is read out (S901).

Next, the scene number is set at 0 (S902). While the scene number is smaller than the number indicated by the number_of_scene in the scene_table (S903), below-described reproduction of the scene is carried out with reference to content of the scene_info corresponding to the scene number (S904). Upon completion of the reproduction of the scene, numeral 1 is added to the scene number (S905).

Figure 18:
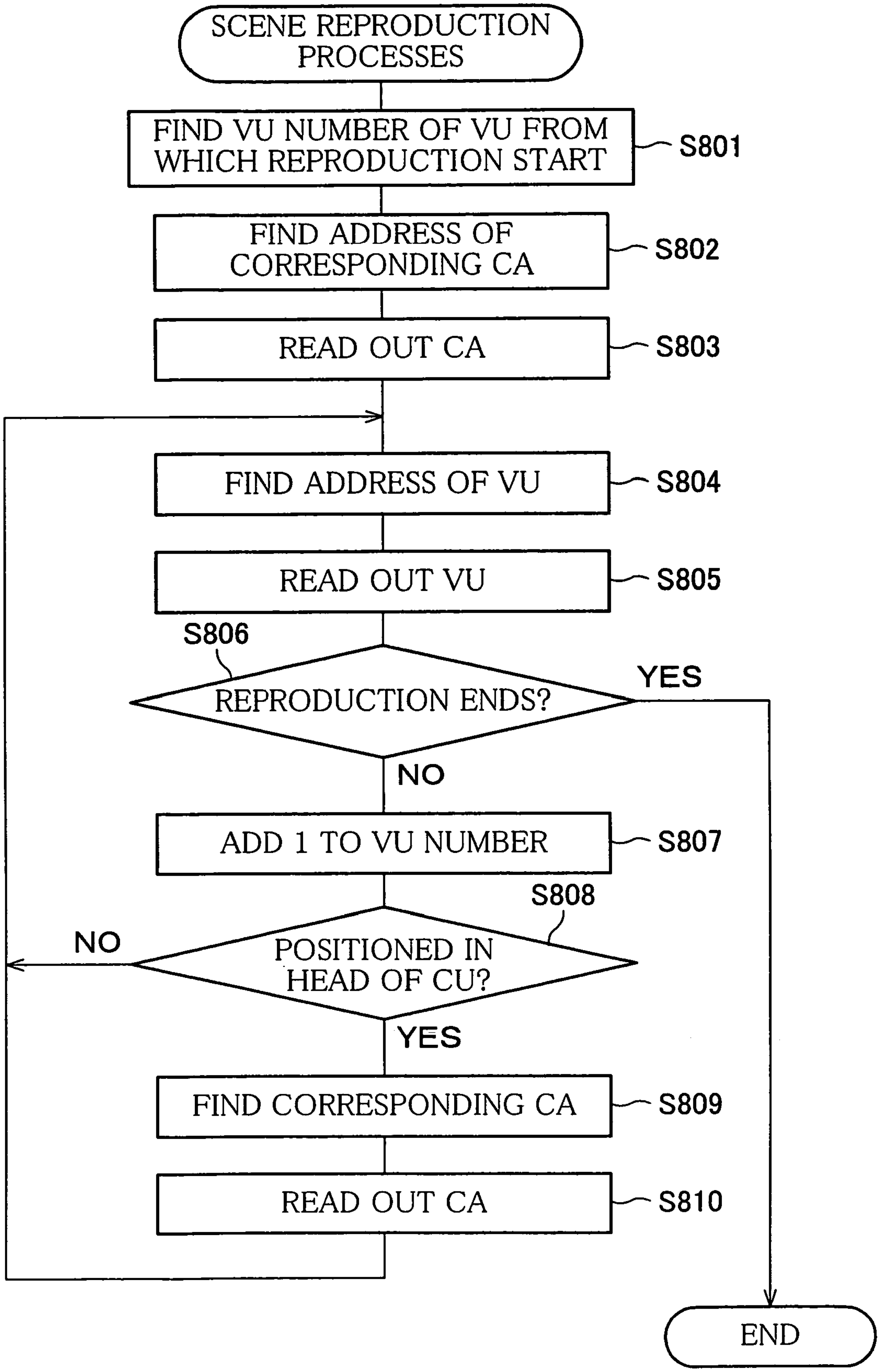
FIG. 18 is a flowchart illustrating a flow of scene reproduction processes in Embodiment 1 of the present invention.

Next, processes of reproducing the scene will be explained with reference to FIG. 18. Firstly carried out is a search for video_unit_info( ) having the largest VU_PTS that is equal to or smaller than the sc_start_PTS (S801), in reference to the video_unit-table( ) of the original management information in the RAM 102. The process in S801 is carried out to find a VU number of the scene from which the reproduction starts. Note that the VU number represents order of sets of the video_unit_info( ) of the video_unit_table( ).

Carried out next is a search for continuous_area_info( ) having the largest CA_PTS that is equal to or smaller than sc_start_PTS (S802), in reference to the continuous_area_table( ). The process in S802 is carried out to find an address of the CA corresponding to the scene from which the reproduction starts. Thereafter, packs are read out from the after-recording data file, those packs falling within a range from (i) a pack specified by a CA_PN in the continuous_area_info( ), to (ii) a pack just before a pack specified by a CA_PN in a next continuous_area_info (S803).

Next, an address of the VU is found in reference to the VU_PN of the video_unit_info( ) which corresponds to the present VU number (S804). Based on the address, the VU is read out from the original stream file (S805). Carried out next is judgment whether or not the scene is over (S806). Specifically, when elapsed reproduction time of the present scene is equal to or exceeds the time specified by the sc_duration of the scene_info( ), the scene is judged to be over.

In cases where the reproduction of the scene is not over, numeral 1 is added to the VU number (S807). Then, carried out is judgment whether or not the VU managed by the video_unit_info( ) is positioned in the head of the CU, by referring to the first_unit_flag of the video_unit_info( ) (S808).

When the first_unit_flag is indicative of 1, the VU managed by the video_unit_info( ) is judged to be positioned in the head of the CU, and the address of the CA is found by performing the aforementioned step (S809). Thereafter, the CA is read out from the after-recording file (S810). On the contrary, when the first_unit_flag is indicative of 0, the VU managed by the video_unit_info( ) is judged to be positioned not in the head of the CU, and the processes from S804 to S808 are repeated.

During the readout of the stream and the data from the optical disc 106, the decoding processes are carried out as follows. The readout VU is sent to the de-multiplexer 112, and the de-multiplexer 112 extracts a video PES packet and an audio PES packet from the VU. The video PES packet is sent to the video reproduction buffer 111, and the audio PES packet is sent to the audio reproduction buffer 110.

The de-multiplexer 112 extracts a SCR from the pack header, and updates the system clock 105. The video decoder 116 and the audio decoder 115 carry out decoding and outputting at the moment when the system clock 105 coincides with a time stamp attached to the PES packet header.

In Embodiment 1, each CU storing the original stream is physically adjacent, in the disc, to each CA storing the after-recorded data to be reproduced in synchronism with the CU. For this reason, even when the scene starts from a VU positioned in the vicinity of a terminal of the CU, the seeking of the VU by moving the pickup from the position of the CA requires only a little suspension time during the data readout.

On the contrary, in the case where the after-recorded data is not positioned adjacent to the original stream to be reproduced in synchronism, the seeking time between (i) the readout of the after-recorded data in the head portion of the scene and (ii) the readout of the original stream corresponds to, at worst, such time that the pickup moves from the innermost side of the disc to the outermost side of the disc. Accordingly, the reproduction in this case is highly likely to be interrupted between the scenes as compared with the present embodiment.

[Processes During After-Recording]

The following explains processes carried out in response to the user's instruction to perform the after-recording. The processes during the after-recording are carried out by performing several processes in addition to the aforementioned reproduction processes. For this reason, explanation here is made only for those differences from the above-described processes.

Firstly, for the recording of the after-recorded data, the audio encoder 117 is launched concurrently with a reproduction start of the scene. A result obtained by encoding the after-recorded data is sent to the audio recording buffer 119 in the form of a PES packet. The multiplexer 113 packs and sends the PES packet to the recording buffer 114 such that the SCR of a pack header and the PTS in a packet header are caused to be matched with those in the original stream, respectively.

At the moment when the recording buffer 114 receives a pack having a PTS exceeding a range of the CU that is being decoded, a pack row in the recording buffer 114 is recorded onto the after-recorded data file. The position of the CA to be recorded is found in accordance with the PTS of: the CU presently being decoded, with reference to the continuous_area_table( ).

In cases where defect occurs during the recording of the CA, the CA that is being-recorded is discarded, and the CA is newly recorded onto another region. A reason for this is that: the defect causes a decrease in a recording region for the CA being recorded, so that the region for the CA can no longer store data corresponding to reproduction time of the relevant CU. In this case, the placement_flag in the continuous_area_info( ) managing the CA is changed to 0 so as to indicate that the CA does not exist before the relevant CU. Also, in the file system management information, an extent of the discarded CA is replaced with an extent of the newly made CA.

This makes it possible to recognize in which part the CA and the CU are not continuously recorded, by merely referring to the placement_flag during the non-destructive editing and the reproduction of the non-destructively edited result. On this account, the user can be notified in advance that reproduction will be highly likely to be interrupted during reproduction of the aforesaid part. Further, the flag can be used in future for re-positioning the CA and the CU, which are not continuously recorded, to be continuously recorded.

Modified Example of Embodiment 1

In Embodiment 1, data is recorded onto the after-recording data file, in accordance with the MPEG-2 format, as is the case with the original stream file; however, data may be recorded onto the after-recording data file, in compliance with the Elementary Stream in which recording does not utilize such packing and packeting. This cuts out the need of the re-packing after extracting an AAU from a pack and replacing the extracted AAU, when overwriting a part of the after-recorded data of the CA.

Further, in Embodiment 1, the CA stores the audio data, but may store different types of data such as graphics data to be superimposed on the video in the original stream.

In Embodiment 1, one AAU can be recorded over a plurality of packs, but may be stored in one pack. With this, a part of the after-recorded data in the CA can be rewritten merely by overwriting a pack containing a relevant AAU.

In Embodiment 1, when occurrence of the defect in the CA is detected during the after-recording, the CA is discarded and the after-recorded data is recorded in another region. However, when (i) the occurrence of the defect has been assumed and (ii) the size of the CA is determined, upon initial picture recording, in consideration of margin for such defect, and (iii) such defect is detected, the after-recorded data may be recorded onto a position coming after the position at which the defect occurred, in the CA. This allows continuous recording of the CA and the CU.

For correlation (correspondence) between the CA and the CU that are handled as different files, the respective head addresses of the CU and the CA can be found in accordance with the time stamp of the head of the data in the CU. However, any way of ensuring the correlation may be used.

Embodiment 1 uses the MPEG-2 PS; however, similar effect can be obtained by using the MPEG-2 TS.

Embodiment 2

Embodiment 2 of the present invention will be explained with reference to FIG. 19.

Differences between Embodiment 1 and Embodiment 2 are as follows. That is, in Embodiment 1, a plurality of sets of data to be synchronously reproduced are continuously disposed in the recording medium, and these sets of data are managed as different files. In contrast, in Embodiment 2, the data sets are in the same reproduction time-line, but are not simultaneously reproduced. In Embodiment 2, reproduction is carried out by switching the data sets between each other.

Specifically, Embodiment 2 utilizes the multi-angle function in the DVD-Video, i.e., a function for switching images viewed from a plurality of angles in the same time-line.

Note that a recording operation according to Embodiment 2 is substantially the same as that of Embodiment 1, i.e., the relation between the original stream and the after-recorded data that should be synchronously reproduced in Embodiment 1 is merely replaced with the relation between two types of the original streams that are in the same time-line in Embodiment 2.

<File Structure>

The video/audio data are multiplexed in compliance with the MPEG-2 PS standard, and are recorded onto different files in accordance with angles. In an example shown in FIG. 19(*a*), first angle data is recorded onto ANGL0001.M2P, and second angle data is recorded onto ANGL0002.M2P.

<Layout in the Disc>

Figure 19:
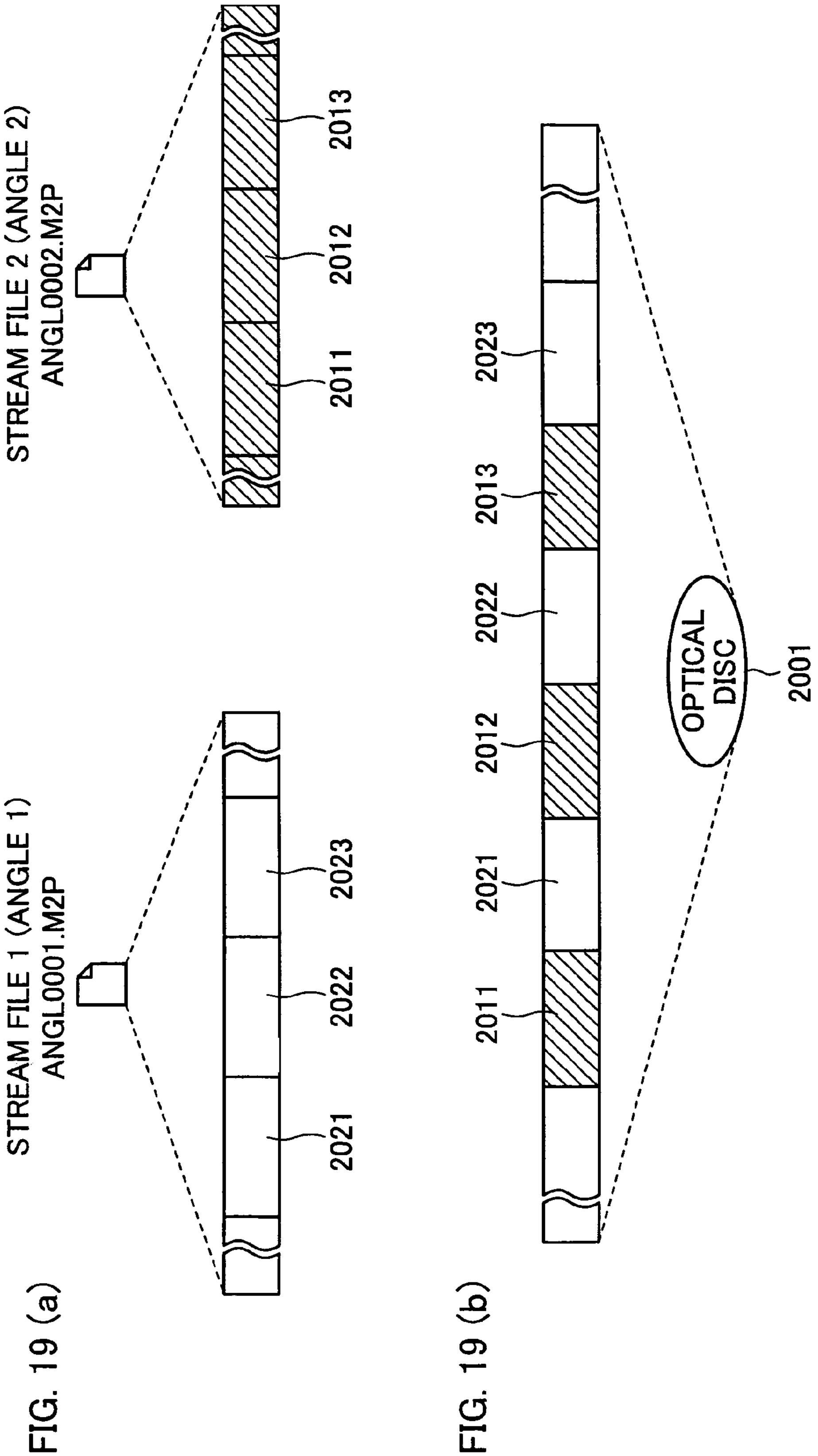
FIG. 19(*a*) and FIG. 19(*b*) illustrate another embodiment of the present invention.
Figure 20:
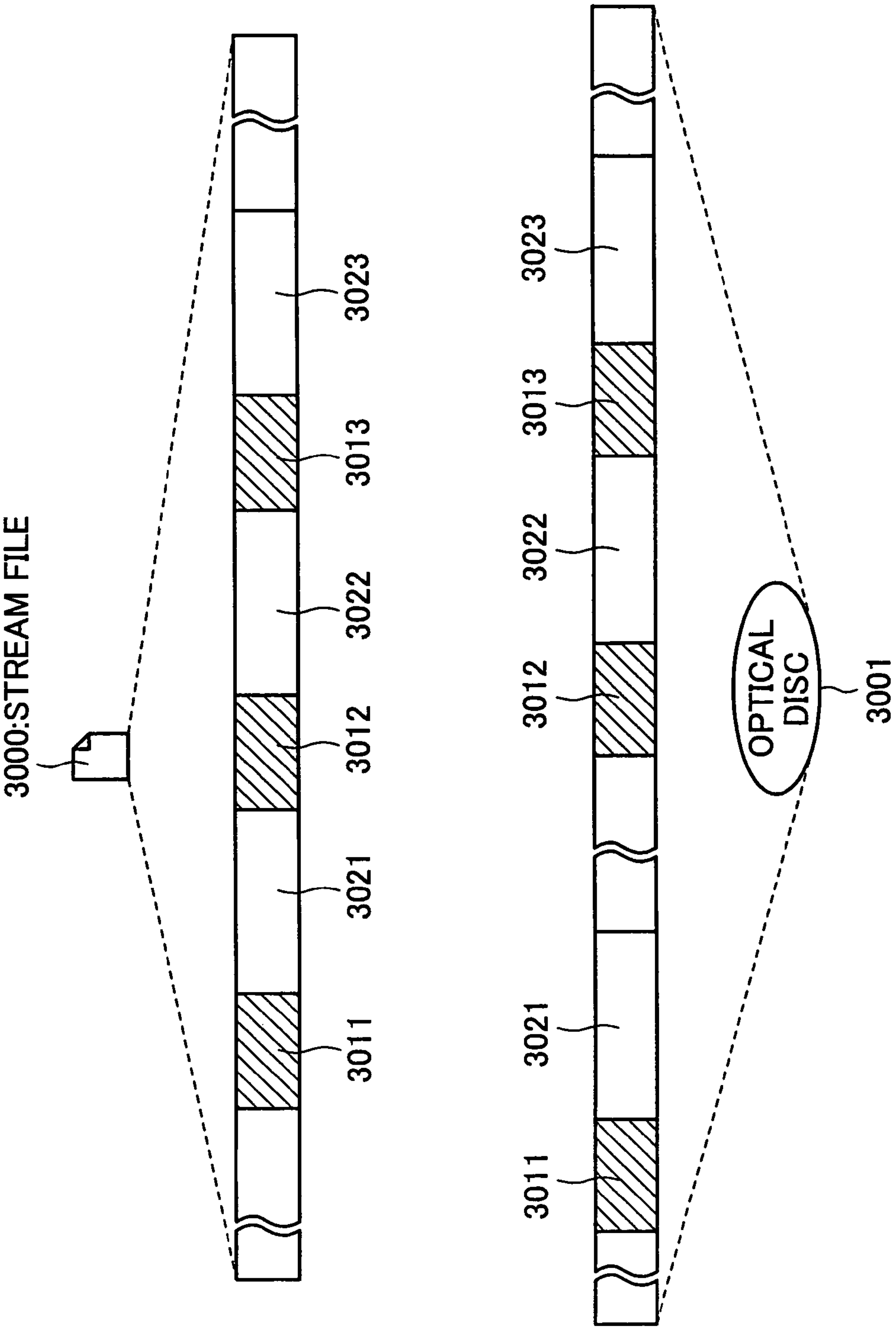
FIG. 20(*a*) and FIG. 20(*b*) illustrate a conventional technique.

As shown in FIG. 19(*b*), the first angle data ANGL0001.M2P is divided into partial data 2021, 2022, and 2023. Likewise, the second angle data ANGL0002.M2P is divided into partial data 2011, 2012, and 2013. These sets of the partial data obtained by dividing ANGL0001.M2P and ANGL0002.M2P are alternately positioned in a disc 2001. A method for determining a dividing scale is similar to a method for positioning multi-angle data in case of the DVD-Video, so that explanation thereof is omitted here.

This allows realization of angle switching response as fast as the multi-angle switching response in the DVD-Video, and allows each of the data files to be reproduced by a general MPEG-2 PS compatible decoder.

Embodiment 3

Embodiment 3 of the present invention will be described with reference to FIG. 21 through FIG. 28.

A difference between Embodiment 3 and Embodiment 1 is as follows. That is, in Embodiment 1, the after-recording region is managed by a single file (i.e., by the after-recording data file (SHRP0001.PRE; see FIG. 4)). In contrast, in Embodiment 3, the file for securing a vacant region is made separately from the file for storing each set of AV data. Note that Embodiment 3 is similar to Embodiment 1, so that explanation here is focused on a difference therebetween.

<File/Directory Structure>

Figure 21:
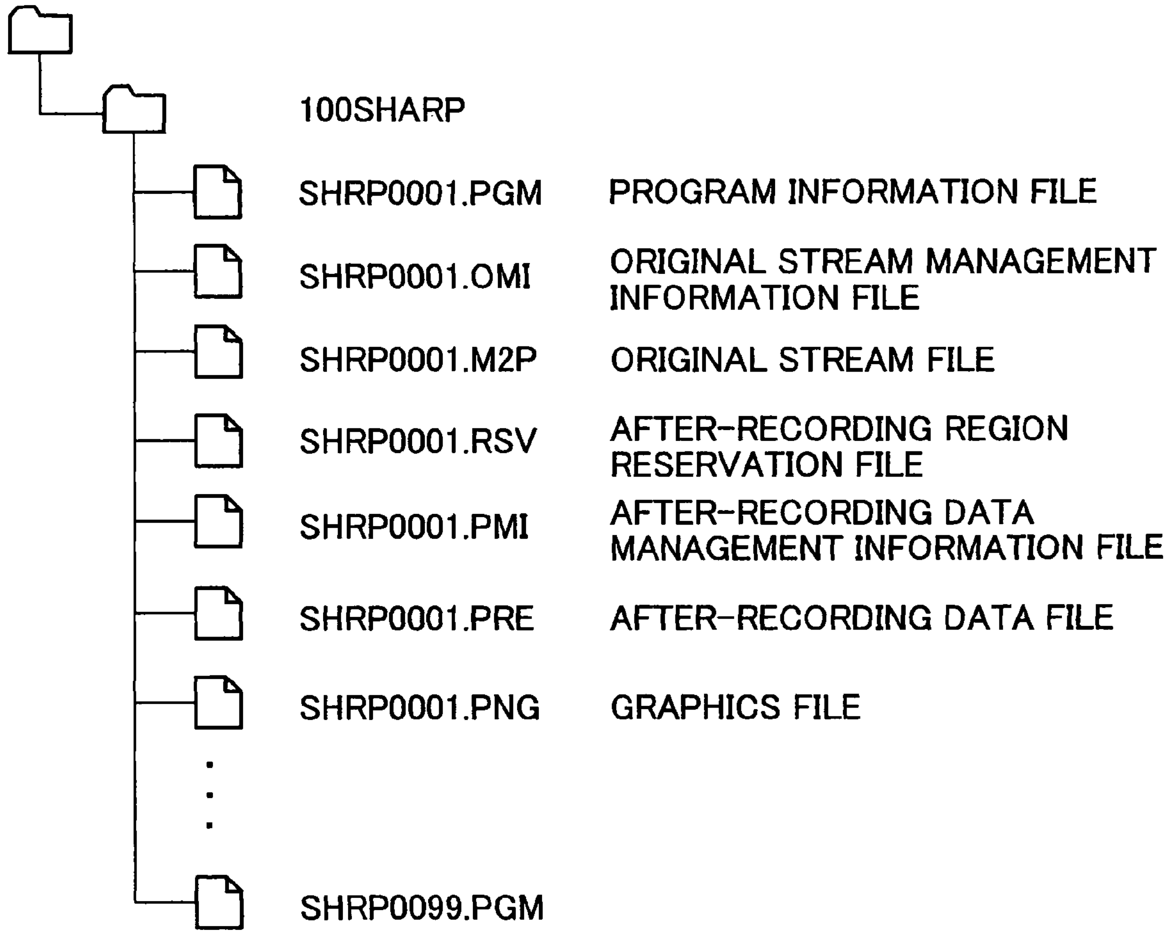
FIG. 21 illustrates a file/directory structure in Embodiment 3 of the present invention.

FIG. 21 illustrates a file/directory structure of Embodiment 3. The file/directory structure is obtained by adding, to the file/directory structure (see FIG. 4) in Embodiment 1, (i) an after-recording region reservation file (SHRP0001.RSV), (ii) an after-recording data management information file (SHRP0001.PMI), and (iii) a graphics file (SHRP0001.PNG).

The after-recording region reservation file (SHRP0001.RSV) is a file for reserving an after-recording region. The after-recording data management information file (SHRP0001.PMI) is management information corresponding to the after-recording data file. The graphics file (SHRP0001.PNG) is a file for storing graphics data superimposed on video. Note that a program information file (SHRP0001.PMG), an original stream management information file (SHRP0001.OMI), and an original stream file (SHRP0001.M2P) are the same as those in Embodiment 1, respectively.

The after-recording region reservation file is made per original stream file, and recording is carried out thereonto during picture recording. The after-recording data management information file is made per after-recording data file. The graphics file is a file added when the non-destructive editing is carried out after the picture recording, and is a file for storing images to be superimposed on the video. Examples of the images include titles and handwritten letters (characters). Such images are stored in compliance with the PNG (Portable Network Graphics).

The after-recording data file (SHR0001.PRE) is not generated until the after-recording is carried out, unlike Embodiment 1. In other words, during the picture recording, the after-recording region reservation file is recorded, in place of the after-recording data file as in Embodiment 1.

<Structure of an AV Stream>

A structure of an AV stream is the same as the structure of the AV stream, explained above with reference to FIG. 5, in Embodiment 1.

<After-Recording Region Reservation File>

The after-recording region reservation file has the same structure as the after-recording data file (see FIG. 6) in Embodiment 1. That is, the after-recording region reservation file is constituted by the integral number of continuous areas (CAs). Each CA corresponds to one CU in the original stream file, and secures a region for storing after-recorded data corresponding to a relevant CU. Note that the CA here is merely in use for securing the region, and is not AV data to be reproduced. For this reason, the CA may contain any kinds of data.

<Layout in the Disc>

Figure 22:
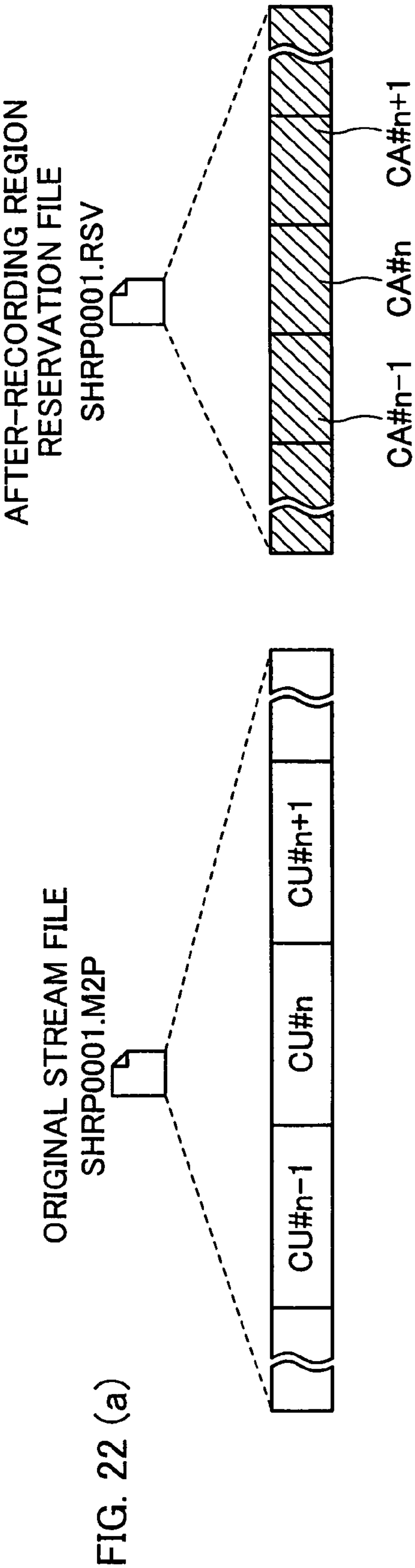
FIG. 22(*a*) and FIG. 22(*b*) illustrate one embodiment of the present invention.
Figure 22:
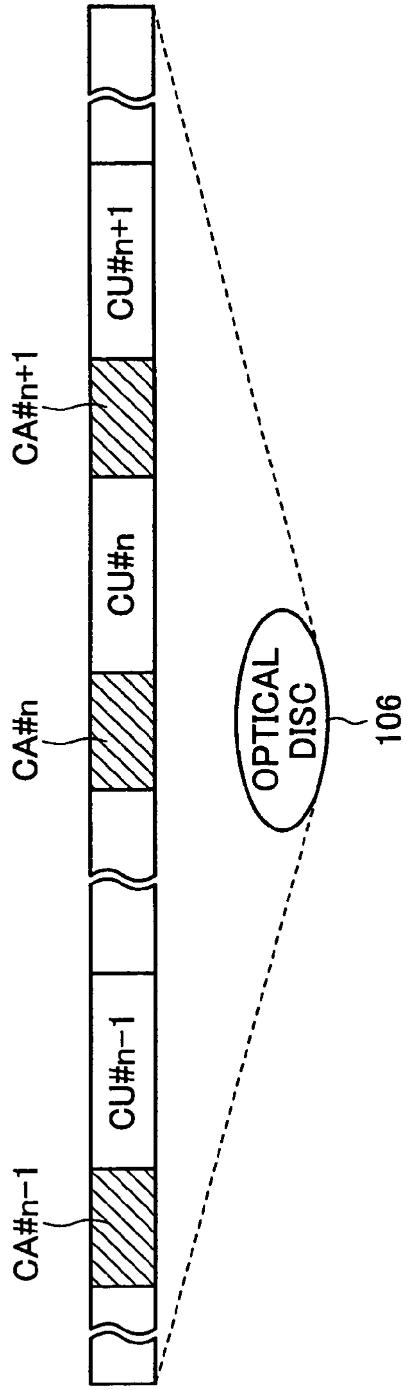

The following explains how data in the files of Embodiment 3 are positioned in the disc. FIGS. 22(*a*) and 22(*b*) illustrate respective positions of the data of the files in cases where no after-recording is carried out after the picture recording (in other words, cases where the after-recording data file is not made.) The original stream file (SHRP0001.M2P) and the after-recording region reservation file (SHRP0001.RSV) correspond to each other, and the CUs of the original stream file (SHRP0001.M2P) and the CAs of the after-recording region reservation file (SHRP0001.RSV) are recorded onto the optical disc 106 such that the CAs respectively come just before the corresponding CUs (see FIG. 22(*b*)).

Figure 23:
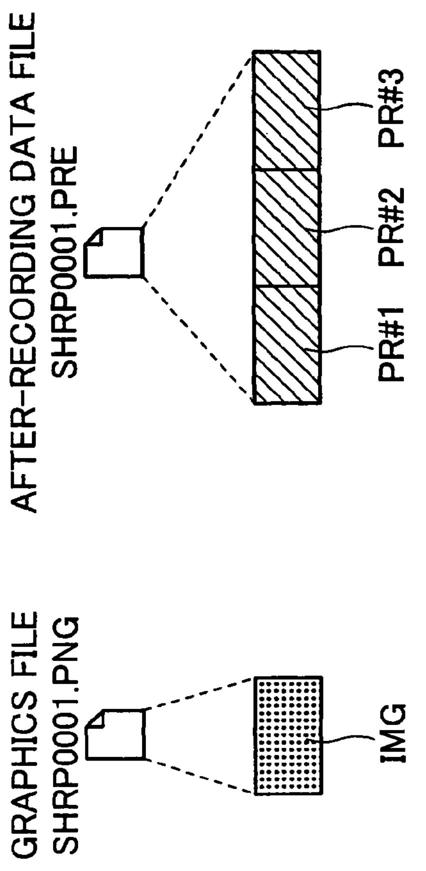
FIG. 23(*a*) illustrates respective data structures of a graphics file and an after-recording data file in Embodiment 3 of the present invention.
Figure 23:
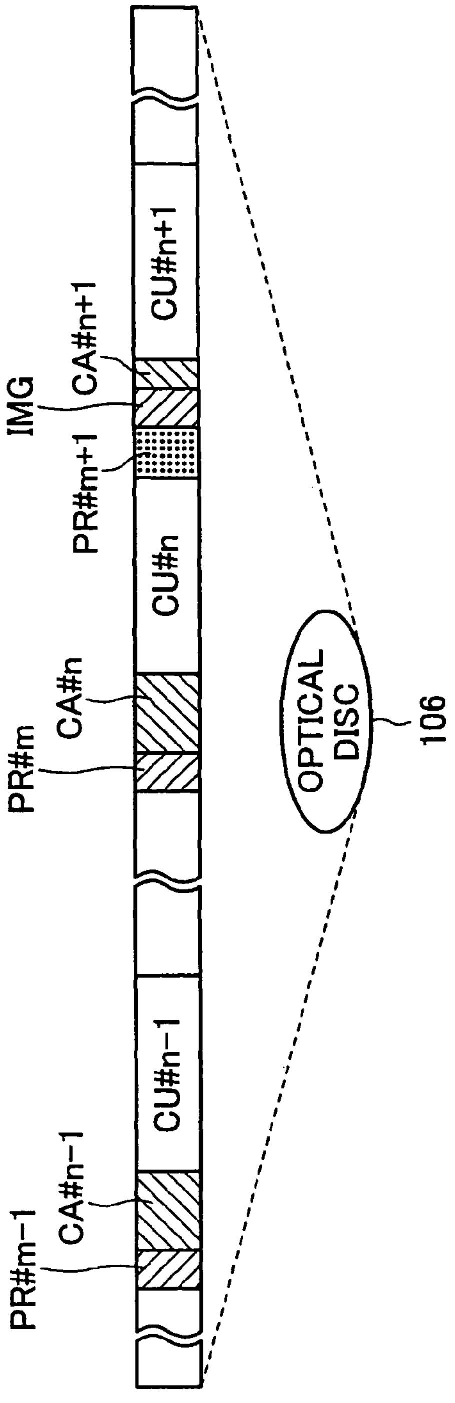
Figure 28:
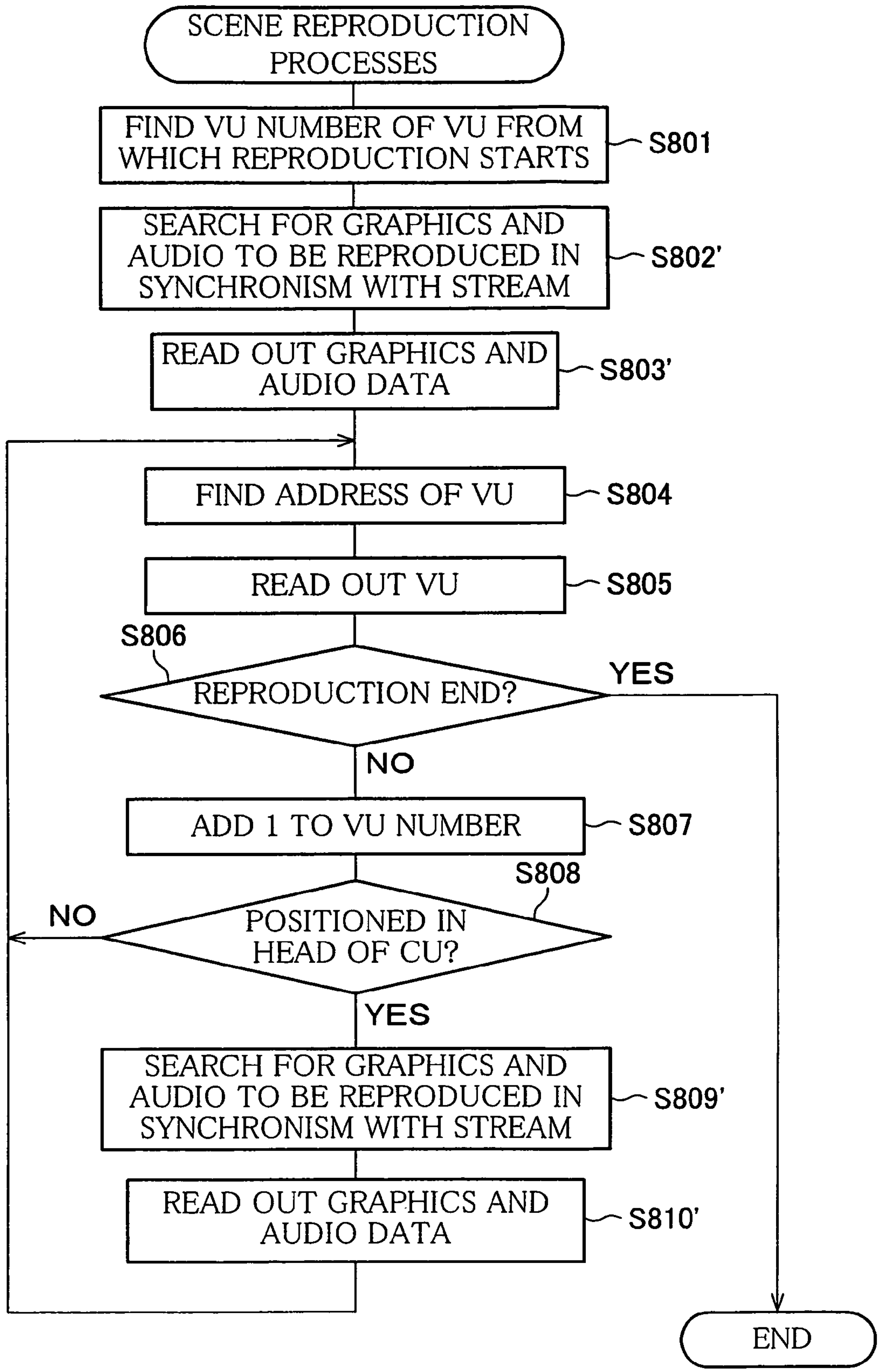
FIG. 28 is a flowchart illustrating a flow of a scene reproduction processes in Embodiment 3 of the present invention.

The following explains respective positions of the data of the files including the after-recording region reservation file, the after-recording data file, and the graphics file, i.e., positions of the data of these files after addition of audio and graphics, with reference to FIGS. 23(*a*) and 23(*b*). FIG. 23(*a*) illustrates respective structures of the graphics file (SHRP0001.PNG) and the after-recording data file (SHRP0001.PRE), each of which is additionally recorded onto the disc. The graphics file stores graphics data IMG. The after-recording data file stores after-recorded audio data PR#1, PR#2, and PR#3 which respectively correspond to CU#n−1, CU#n, CU#n+1 in the original stream file shown in FIG. 22(*a*).

The IMG and the PRs are positioned in the optical disc 106 as shown in FIG. 23(*b*). Specifically, in FIG. 22(*b*), the PR#1 is positioned within a region secured by the CA#n−1, the PR#2 is positioned within a region secured by the CA#n, and the PR#3 is positioned within a region secured by the CA#n+1. The graphics data IMG is positioned within a region secured by the CA#n+1.

Such Positioning of the IMG and the PRs within the respective regions secured by the CAs causes reduction of respective region sizes of the CA#n−1, the CA#n, and the CA#n+1. The reduction is realized by changing extents in the file system management information, these extents managing the respective regions of the CAs.

Thus, such various types of data can be added with ease after the picture recording, by introducing the after-recording region reservation file for managing vacancy in the after-recording regions. Further, the graphics data and the after-recording audio data are stored in the different files, so that a different program can refer merely to the graphics data. This allows more flexibility.

<Formats of Management Information Files>

A format of the original stream management information file is the same as that of the original stream management information file in Embodiment 1, so that explanation thereof is omitted here. A format of the after-recording data management information file is almost the same as that of the original stream management information file in Embodiment 1, but p_attribute( ) and the continuous_area_table( ) are not in the original stream management information file unlike in Embodiment 1.

Next, FIG. 24 illustrates a structure of a program information file. The program information file according to Embodiment 3 includes: (i) subaudio_table( ) for managing the audio data added after the picture recording; and (ii) graphics_table( ) for managing the graphics data added after the picture recording, unlike the program information file (see FIG. 14) according to Embodiment 1.

As shown in FIG. 25(*a*), the subaudio_table( ) is made up of (i) number_of_subaudio for indicating the number of sets of the audio data; and (ii) subaudio_info( ) for storing information about the respective sets of the audio data. As shown in FIG. 25(*b*), the subaudio_info( ) is made up of (i) SA_filename for storing a filename of the after-recording data management information file used for managing predetermined audio data; (ii) SA_flags for managing various attributions of predetermined audio data; (iii) SA_start_time for indicating reproduction start timing of the audio data in the program; and (iv) SA_duration for indicating reproduction duration time of the audio data in the program.

On the other hand, as shown in FIG. 26(*a*), the graphics_table( ) is made up of (i) number_of_graphics for indicating the number of graphics files; and (ii) graphics_info( ) for storing information about each of the graphic files. As shown in FIG. 26(*b*), the graphics_info( ) is made up of (i) gr_filename for storing a filename of a predetermined graphics file; (ii) gr_flags for managing various attributions of predetermined graphics data; (iii) gr_start_time for indicating reproduction start timing of the graphic data in the program; and (iv) gr_duration for indicating reproduction duration time of the graphic data in the program.

The SA_flags and the gr_flags have an identical structure, and each of them includes a flag termed "interleave_flag" as shown in FIG. 27(*a*). The interleave_flag is 1-bit information. See FIG. 27(*b*). When the interleave-flag is indicative of 0 b, managed audio data or a managed graphics file does not come just before a relevant CU (that is to be reproduced in synchronism with the audio data or the graphics file). In contrast, when the interleave_flag is indicative of 1 b, the managed audio data or the manage graphics file comes just before the relevant CU (that is to be reproduced in synchronism with the audio data or the graphics file). Reference to the flag allows realization whether or not reproduction of a non-destructive edited result possibly causes interruption in the reproduction. In other words, when the flag is indicative of 0 b, the seeking of a CA is carried out, so that the reproduction is highly likely to be interrupted.

<A Method for Determining a CU Scale>

A method for determining a CU scale is the same as the method explained with reference to FIG. 7 and FIG. 8 in Embodiment 1.

<Processes During Recording>

Processes during recording are the same as the processes explained with reference to FIG. 16 in Embodiment 1.

<Processes During Reproduction>

The following explains processes performed in response to user's instruction for reproduction of the program having already been subjected to the after-recording. Flow of the processes is essentially the same as the flow explained with reference to the flowchart of FIG. 17 in Embodiment 1, so that explanation for the same processes explained above is omitted here. A difference between the reproduction processes according to Embodiment 3 and those according to Embodiment 1 lies in processes of reproducing the scenes. For this reason, the following explanation addresses the scene reproduction processes with reference to FIG. 28.

Firstly carried out is a search for video_unit_info( ) having the largest VU_PTS that is equal to or smaller than the sc_start_PTS (S801), in reference to the video_unit_table( ) of the original management information in the RAM 102. Note that order of sets of the video_unit_info( ) in the video_unit_table( ) is represented by VU numbers.

Next, a search is carried out for checking presence of a graphic file and audio data, each of which is to be reproduced in synchronism with a CU including a present VU (S802'). The search is carried out with reference to the graphics_table( ) and the subaudio_table( ) of the program information file. When such a graphics file and such audio data exist, the graphics file is read out, and corresponding audio data is read out in reference to the audio data management information file managing the audio data (S803').

Next, an address of the VU is found with reference to the VU_PN of the video_unit_info( ) which corresponds to the present VU number (S804). Based on the address, the VU is read out from the original stream file (S805). Carried out next is judgment whether or not the scene is over (S806). Specifically, when elapsed reproduction time of the present scene is equal to or exceeds the time specified by the sc_duration of the scene_info( ), the scene is judged to be over.

When the reproduction of the scene is not over, numeral 1 is added to the VU number (S807), and reference is made to the first_unit_flag in the video_unit_info. In cases where the first_unit_flag is indicative of 1, the VU managed by the video_unit_info( ) is positioned in the head of the CU (S808). Then, the check is carried out, in accordance with the aforementioned steps, for presence of the graphics file and the audio data which are to be used for the synchronized reproduction (S809'). When such a graphics file and such audio data are found, they are read out in accordance with the aforementioned steps (S810').

<Processes During the After-Recording>

The following explains processes performed in response to user's instruction for the after-recording. The processes during the after-recording are performed by performing several processes in addition to the aforesaid reproduction processes. For this reason, the explanation here addresses only a difference therebetween.

Firstly, presence of after-recording regions (regions for the after-recording) in the recording medium is checked. Specifically, the check is carried out with respect to the continuous_area_info of the management information file about the stream that is to be after-recorded, in order to find whether or not each region secured by the after-recording region reservation file has a size capable of storing the after-recorded data. When the size of the region is sufficient, the after-recorded data is recorded onto the region. When the size of the region is insufficient, the after-recorded data is recorded onto a region other than the region secured by the after-recording region reservation file.

Next, the audio encoder 117 is launched concurrently with start of reproduction. An encoded result of the after-recorded data is sent to the audio recording buffer 119, in the form of PES packets. The multiplexer 113 packs and sends the PES packets to the recording buffer 114 such that a SCR of a pack header and a PTS in a packet header correspond to those in the original stream, respectively.

At the moment when the recording buffer 114 receives a pack having a PTS exceeding a range of a CU that is presently being decoded, the pack row in the recording buffer 114 is recorded onto the after-recording data file. A position of the CA to be recorded is found in accordance with the PTS of the CU presently being decoded, with reference to the continuous_area_table( ). The after-recorded data recorded onto the after-recording data file is recorded onto the region secured by the CA.

At the moment of completion of the after-recording, the followings are carried out. Firstly carried out is creation of the after-recording data management file which corresponds to the after-recording data file thus recorded. Upon the creation of the after-recording data management file, a set of video_unit_info( ) is made per CU.

Next, an entry is added to the subaudio_table of the program information file. In cases where the after-recorded data is recorded onto the region secured by the after-recording region reservation file, the interleave_flag of the SA_flags( ) is set at 1 upon the addition of the entry. In contrast, in cases where the after-recorded data is not recorded onto the region, the interleave_flag is set at 0 thereupon.

Further, the region storing the after-recorded data is ruled out of scope of the file management of the after-recording region reservation file. In other words, the size of the after-recording region reservation file is reduced. Moreover, a CA_PN corresponding to each entry in the continuous_area_table( ) is reduced by the reduced size. With this, reference to the continuous_area_info( ) allows recognition of remained data storage space in each CA.

<Processes During Addition of the Graphics Data>

The following explains processes performed in response to user's instruction for adding, to the video, the graphics data that is to be superimposed on the video. Firstly, presence of a region for storing the file containing the graphics data is checked. Specifically, a check is carried out with respect to the continuous_area_info( ) in the management information file about the stream to which the graphics data is to be added, and a check is carried out for presence of a region for storing the graphics data in a CA corresponding to a CU containing a video frame from which the graphic data to be superimposed starts to be displayed.

When the graphics data can be recorded onto the CA, the graphics data is recorded onto the region. As is the case with the completion of the after-recording, the region storing the graphics data is ruled out of the scope of the management by the after-recording region reservation file. CA_PNs of entries of CAs coming after the CA are reduced by the reduced size. Moreover, one entry of the graphics_info( ) is added to the graphics_table( ) of the program information file, and the interleave_flag of the gr_flags( ) in the entry is set at 1. In this case, the graphics data is so recorded onto the disc as to be positioned adjacent to the video data to be reproduced together. With this, no seeking is required for readout of the graphics data upon the video reproduction. This restrains the interruption of the video reproduction due to the seeking, and reduces power consumption.

In contrast, when the graphics data cannot be recorded in the CA, the graphics data is recorded onto another region. One entry of the graphics_info( ) is added to the graphics_table( ) of the program information file, and the interleave_flag of the gr_flags( ) in the entry is set at 0. By referring to the flag during the reproduction, it is possible to notify, before the video reproduction, the user that the video reproduction is possibly interrupted.

Modified Example of Embodiment 3

In Embodiment 3, the graphics file and the after-recording data file is additionally recorded after the picture recording; however, the files may be recorded during the picture recording. Also in this case, the graphics file and the after-recording data file can be handled as independent files from the video file. Moreover, the video file is a general MPEG-2 PS file, and the seeking is not required for the synchronized reproduction.

In Embodiment 3, the graphics file is in compliance with the PNG format, but may be in compliance with other file formats such as the JPEG.

Embodiment 4

Embodiment 4 of the present invention will be explained with reference to FIGS. 29 and FIGS. 30. Embodiment 4 is the same as Embodiment 1 except the positioning of the data (file) in the disc and the method for determining the CU scale. In other words, Embodiment 4 provides variations of the positioning and the method of Embodiment 1. For this reason, the following explanation addresses the differences.

<File/Directory Structure>

A file/directory structure in Embodiment 4 is the same as that in Embodiment 1, so that explanation thereof is omitted.

<Structure of AV Stream>

A difference between a structure of an AV stream in Embodiment 4 and that in Embodiment 1 lies in only that: the CUs may not be continuously recorded in the present embodiment.

<After-Recording Data File>

An after-recording data file in Embodiment 4 is the same as that in Embodiment 1, so that explanation thereof is omitted.

<Layout in the Disc>

Figure 29:
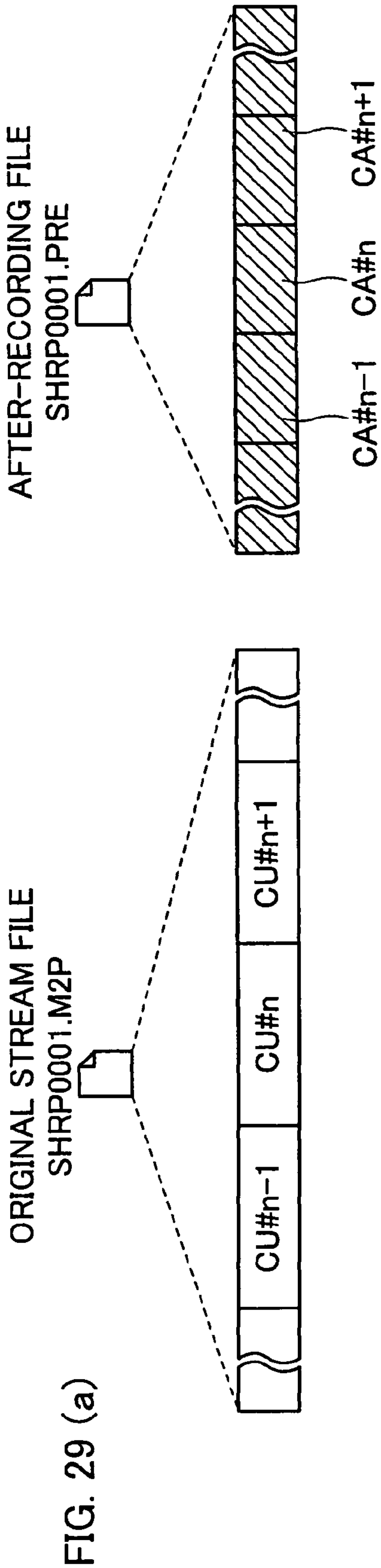
FIG. 29(*a*) and FIG. 29(*b*) illustrate one embodiment of the present invention.
Figure 29:
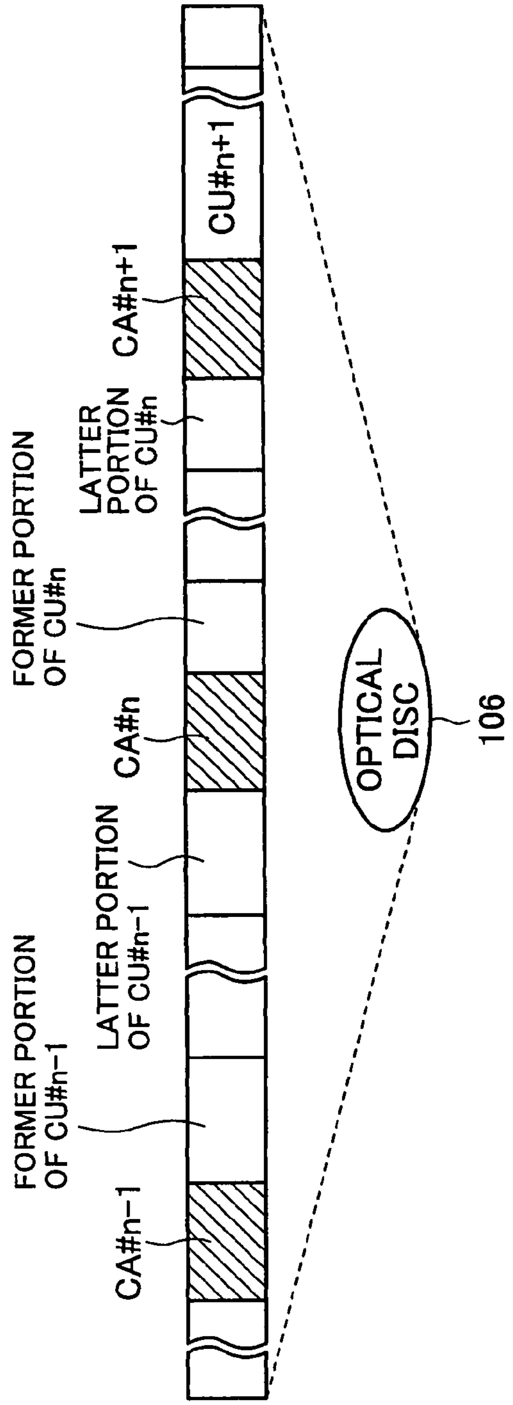

The following explains how respective data of an original stream file and an after-recording data file are positioned in the disc, with reference to FIGS. 29. FIG. 29(*a*) illustrates the original stream file (SHRP0001.M2P) and the after-recording data file (SHRP0001.PRE) which correspond to each other. Essentially, the respective data of the original stream file and the after-recording data file are recorded onto the optical disc 106 such that a CA comes just before a corresponding CU, like in Embodiment 1. However, the CU may be divided, unlike Embodiment 1. FIG. 29(*b*) illustrates an example in which a CU#n−1 and a CU#n are provided. However, it should be noted that the CA must not be divided. Note also that a total of reproduction time of VUs in one continuous region must be equal to or longer than reproduction time of the CU.

Such division of the CU allows a vacant region to be effectively used. For example, see a case where CUs each corresponding to 16 seconds are respectively recorded onto continuous vacant regions that are in the optical disc 106 and that correspond to 20 seconds in total. In cases where each CU is not divided, the vacant regions used for the recording correspond to only 16 seconds, and the remaining corresponding to 4 seconds is left unused. On the contrary, in cases where the CU is divided, the vacant regions corresponding to 20 seconds can be fully used.

<A Method for Determining a CU Scale>

Figure 30:
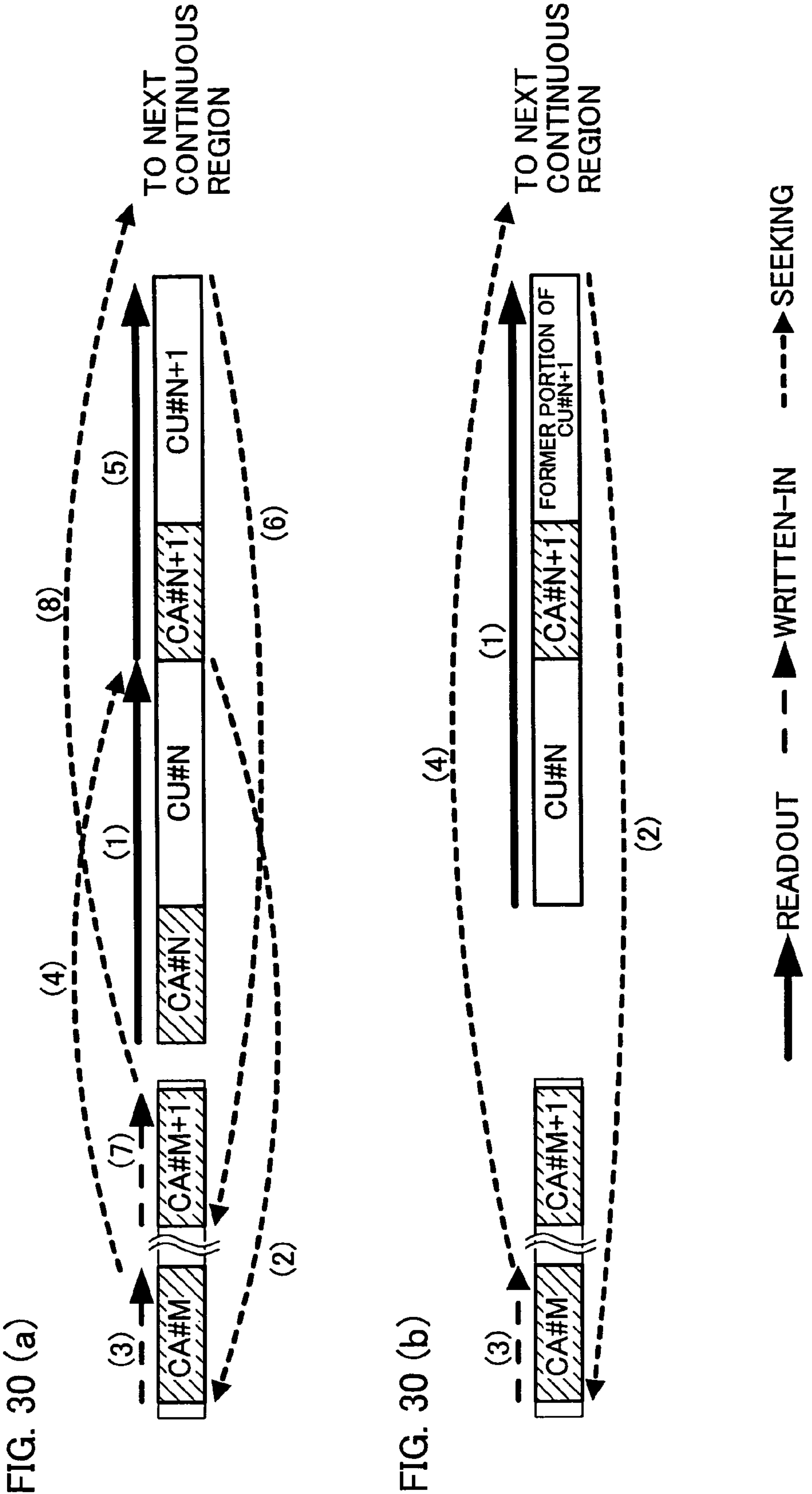
FIGS. 30(*a*) and 30(*b*) illustrate a reference after-recording algorism in Embodiment 4 of the present invention.

The following explains a method for determining reproduction time of a CU, with reference to FIG. 30. As is the case with Embodiment 1, in the method, the reproduction time of the CU is determined such that the seamless reproduction does not fail when the after-recording is carried out with the use of (i) a device (reference device model) set as a reference for ensuring compatibility between devices; and (ii) an after-recording algorism (reference after-recording algorism) set as a reference therefor.

The reference device model is the same as that of Embodiment 1, so that explanation thereof is omitted.

The reference after-recording algorism can be described as follows:

(a) Essentially, upon completion of readout of a present CU, recording of a CA is carried out.

(b) In cases where an end of a CU coming after the presently-readout CU is stored in a different continuous region, recording of the CA is postponed until readout of the subsequent CU is over.

FIGS. 30(*a*) and 30(*b*) illustrate examples of the reference after-recording algorism. FIG. 30(*a*) illustrates an example of the above operation (a). Note that the numbers (1) through (8) in FIGS. 30 respectively correspond to the following numbers (1) through (8).

(1) Read out an n-th CU termed "CU#N". (2) Move the pickup to a CA#M that should be recorded next, upon completion of encoding of after-recorded data corresponding to the CA#M. (3) Record the after-recorded data onto the CA#M. (4) Move the pickup to a CU#N+1. (5) Read out the CU#N+1. (6) Move the pickup to a CA#M+1 that should be recorded next, upon completion of encoding of after-recorded data corresponding to the CA#M+1. (7) Record the after-recorded data onto the CA#M. (8) Move the pickup to a CU#N+2.

See the case of FIG. 30(*b*) illustrating an example of the above operation (b): (1) Read out the CU#N, but skip the recording of the CA immediately after the readout of the CU#N, and then read out a former portion of a CU#N+1 coming after the CN#N. This is because the CU#N and the former portion of the CU#N+1 are positioned in the same continuous region, and because an end of the CU#N+1 is positioned in a different continuous region. (2) Move the pickup to a CA#M upon completion of reading out the CU#N+1 until the end of the continuous region. (3) Record the after-recorded data onto the CA#M. (4) Move the pickup to a latter portion of the CU#N+1.

With such an algorism, a jump between the continuous regions and a jump for the recording of the CA can be carried out at a time even in the case where the CU is divided. This minimizes the interruption of the data readout due to such jumps, with the result that each continuous region can have a smaller length and each CU and each CA have smaller scales. On this account, the vacant regions in the disc can be effectively used.

In the case where the after-recording is carried out with the use of the aforesaid reference device model and the aforesaid reference after-recording, the after-recording buffer 504 is surely free from the overflow, and the track buffer 502 is surely free from the underflow, as long as the following condition is satisfied.

That is, the condition is satisfaction of Formula (1) described in Embodiment 1. Note that symbols in Embodiment 4 have the same meanings as the symbols in Embodiment 1, respectively, as long as specific explanation of such symbols is not made.

As is the case with Embodiment 1, Tw(i) in Formula (1) is represented by Formula (4). However, Tr(i) therein is represented by the following Formula (8):

$$Tr(i)=Te(i)\times Ro/Rs+Te(i)\times Ra/Rs \quad (8)$$

Formula (8) is a formula obtained by removing, from Formula (3), Ta indicating the jump.

A reason for removing Ta indicating the jump is as follows. That is, in Embodiment 4, the jump during the readout of the CU is carried out at the time of recording the CA, so that the jump during the readout of the CU is regarded as the jump during the recording of the CA. This allows reduction of respective scales that the CU and the continuous region finally have.

When Formula (8) and Formula (4) are substituted in Formula (1) to solve for Te(i), a condition of Te(i) ensuring the real-time after-recording is obtained as the following Formula (9):

$$Te(i) \geq \frac{2Ta\times Rs}{Rs-Ro-2Ra} \quad (9)$$

Accordingly, the CU reproduction time lower limit value Temin that ensures the after-recording is represented by the following formula (10):

$$Temin = \frac{2Ta\times Rs}{Rs-Ro-2Ra} \quad (10)$$

A CU reproduction time upper limit value Temax is so set as to satisfy the following Formula (11):

$$Temax = \frac{2Ta\times Rs}{Rs-Ro-2Ra} + Tvmax \quad (11)$$

where Tvmax indicates maximum reproduction time of the VU.

The setting of the upper limitation value of the CU reproduction time is carried out so as to allow for estimation of maximum retardation memory amount required for the synchronized reproduction of the after-recorded audio and the normal audio, and so as to ensure reproduction compatibility. Note that, in Embodiment 4, the multiplexing interval lower limit value Temin is set according to the audio bit rate Ra and the video bit rate Rv; however, the lower limit value may be constant at any value as long as the lower limit value is based on the maximum bit rate.

Moreover, reproduction time of the VU in the stream may be constant or variable as long as the reproduction time of the CU is in accordance with the aforementioned restriction.

<Required Buffer Memory Amount>

In the present embodiment, a volume required, during the after-recording, in the track buffer 502 is determined based on the following idea. That is, in Embodiment 4, the largest volume is required in cases where the recording of the after-recorded data is serially carried out onto the CAs. Specifically, the largest volume is required in cases where each of the CUs is divided in a portion just before an end of the CU. In other words, the largest volume is required in cases where the CU is separately stored in two continuous regions, and where most data in the CU is stored in a former one of the continuous regions.

In this case, according to the aforesaid reference after-recording algorism, the after-recording is carried out in the following manner. That is, the readout of the CU continues until a portion just before the end of the CU, and then the pickup moves to the CA so as to record the after-recorded data. Then, the pickup moves back so as to read out the slight amount of the remained data in the CU. Immediately after the readout, the pickup moves to the next CA to record the after-recorded data, and moves back to read out the CA. Such an operation requires a volume that allows for reproduction continuously lasting over a period corresponding to (i) two recording operations of the after-recording data with respect to the CAs; and (ii) the readout operation of one CA. A specific way of securing such a volume Bpb of the track buffer memory 502 is to be in accordance with the following Formula (12):

$$Bpb=(2\times(2\times Ta+Temax\times Ra/Rs)+Temax\times Ra/Rs)\times Ro \quad (12)$$

<Formats of the Management Information Files>

Formats of the management information files in Embodiment 4 are the same as those in Embodiment 1, respectively, so that explanation thereof is omitted here.

<Processes During Recording>

Processes during recording in Embodiment 4 are the same as those in Embodiment 1, except that Embodiment 4 is free from the restriction in continuously recording the CUs onto the disc.

<Processes During Reproduction>

Processes during reproduction in Embodiment 1 are the same as those in Embodiment 4, so that explanation thereof is omitted here.

<Processes During After-Recording>

Processes during after-recording in Embodiment 4 are the same as those in Embodiment 1, except that the algorism shown in FIGS. 30 is utilized during the after-recording. For this reason, explanation thereof is omitted here.

Modified Example of Embodiment 4

Embodiment 4 is explained as a variation of Embodiment 1; however, Embodiment 4 is applicable to (i) a case where the after-recording region reservation file is used as in Embodiment 3, and (ii) a case where one file deals with the stream data and the after-recorded data as in Japanese Laid-Open Patent Publication Tokukai 2001-43616. In other words, essence of the invention disclosed by the present embodiment lies in (i) the respective physical positioning of the after-recording region and the initially recorded video data; and (ii) the model setting for setting the parameters for the positioning.

INDUSTRIAL APPLICABILITY

The present invention is applicable to a digital recording/reproducing apparatus (video disc recorder) that has an after-recording function and that uses disc (disk) recording medium such as a DVD and a hard disk.

The invention claimed is:

1. A method for recording, onto a recording medium, at least first AV data and second AV data both of which constitute a scene to be reproduced by switching with each other in a same time-line, the method comprising:

a first step of dividing the first AV data into first partial AV data in accordance with a predetermined rule, and of dividing the second AV data into second partial AV data in accordance with a predetermined rule;

a second step of recording, onto the recording medium, the first partial AV data and the second partial AV data by alternately disposing the first partial AV data and the second partial AV data, which are to be reproduced by switching with each other;

a third step of recording, onto the recording medium, file system management information for managing information for handling as different files the first AV data and the second AV data both recorded in the second step;

a fourth step of recording a first AV data management information file for managing the first AV data, and a second AV data management information file for managing the second AV data; and a fifth step of recording, onto the recording medium, a program information file for associating the first AV data with the second AV data for handling as a single content the first AV data and the second AV data both recorded in the second step, wherein:

the file system management information includes position information of the first partial AV data arranged in an order of reproducing the first partial AV data, and position information of the second partial AV data arranged in an order of reproducing the second partial AV data;

the program information file includes a filename of the first AV data management information file, a filename of the second AV data management information file, and a time stamp indicating a start time of the scene;

the first AV data management information file includes a time stamp indicating a start time of a respective video unit which is a constituent of the scene and can be an entry point for reproduction of the first AV data; and the second AV data management information file includes a time stamp indicating a start time of a respective video unit which is a constituent of the scene and can be an entry point for reproduction of the second AV data.

2. An AV data recording apparatus for recording, onto a recording medium, at least first AV data and second AV data both of which constitute a scene to be reproduced by switching with each other in a same time-line, the AV data recording apparatus comprising:

a first section for dividing the first AV data into first partial AV data in accordance with a predetermined rule, and for dividing the second AV data into second partial AV data based in accordance with a predetermined rule;

a second section for recording, onto the recording medium, the first partial AV data and the second partial AV data by alternately disposing the first partial AV data and the second partial AV data, which are to be reproduced by switching with each other;

a third section for recording, onto the recording medium, file system management information for managing information for handling as different files the first AV data and the second AV data both recorded by the second section;

a fourth section for recording a first AV data management information file for managing the first AV data, and a second AV data management information file for managing the second AV data; and a fifth section for recording, onto the recording medium, a program information file for associating the first AV data with the second AV data for handling as a single content the first AV data and the second AV data both recorded by the second section, wherein:

the file system management information includes position information of the first partial AV data arranged in an order of reproducing the first partial AV data, and position information of the second partial AV data arranged in an order of reproducing the second partial AV data;

the program information file includes a filename of the first AV data management information file, a filename of the second AV data management information file, and a time stamp indicating a start time of the scene;

the first AV data management information file includes a time stamp indicating a start time of a respective video unit which is a constituent of the scene and can be an entry point for reproduction of the first AV data; and the second AV data management information file includes a time stamp indicating a start time of a respective video unit which is a constituent of the scene and can be an entry point for reproduction of the second AV data.

3. A non-transitory computer readable recording medium for storing a program for causing a computer to record onto a recording medium at least first AV data and second AV data both of which constitute a scene to be reproduced by switching with each other in a same time-line, the program causing the computer to perform:

a first step of dividing the first AV data into first partial AV data in accordance with a predetermined rule, and of dividing the second AV data into second partial AV data in accordance with a predetermined rule;

a second step of recording, onto the recording medium, the first partial AV data and the second partial AV data by alternately disposing the first partial AV data and the second partial AV data, which are to be reproduced by switching with each other;

a third step of recording, onto the recording medium, file system management information for managing information for handling as different files the first AV data and the second AV data both recorded in the second step;

a fourth step of recording a first AV data management information file for managing the first AV data, and a second AV data management information file for managing the second AV data; and a fifth step of recording, onto the recording medium, a program information file for associating the first AV data with the second AV data for handling as a single content the first AV data and the second AV data both recorded in the second step, wherein:

the file system management information includes position information of the first partial AV data arranged in an order of reproducing the first partial AV data, and position information of the second partial AV data arranged in an order of reproducing the second partial AV data;

the program information file includes a filename of the first AV data management information file, a filename of the second AV data management information file, and a time stamp indicating a start time of the scene;

the first AV data management information file includes a time stamp indicating a start time of a respective video unit which is a constituent of the scene and can be an entry point for reproduction of the first AV data; and the second AV data management information file includes a time stamp indicating a start time of a respective video unit which is a constituent of the scene and can be an entry point for reproduction of the second AV data.

4. A non-transitory data recording medium readable by an apparatus capable of playback of AV data, the medium storing at least first AV data and second AV data both of which constitute a scene to be reproduced by switching with each other in a same time-line, wherein:

the first AV data and the second AV data are stored on the recording medium such that the first AV data is divided into first partial AV data having a predetermined interval, and the second AV data is divided into second partial AV data having a predetermined interval, and the first partial AV data and the second partial AV data, which are to be reproduced by switching with each other, are disposed alternately;

the recording medium further storing:

file system management information for handling as different files the first AV data and the second AV data;

a first AV data management information file for managing the first AV data;

a second AV data management information file for managing the second AV data; and a program information file for associating the first AV data with the second AV data for handling as a single content the first AV data and the second AV data, wherein:

the file system management information includes position information of the first partial AV data arranged in an order of reproducing the first partial AV data, and position information of the second partial AV data arranged in an order of reproducing the second partial AV data;

the program information file includes a filename of the first AV data management information file, a filename of the second AV data management information file, and a time stamp indicating a start time of the scene;

the first AV data management information file includes a time stamp indicating a start time of a respective video unit which is a constituent of the scene and can be an entry point for reproduction of the first AV data; and the second AV data management information file includes a time stamp indicating a start time of a respective video unit which is a constituent of the scene and can be an entry point for reproduction of the second AV data.

5. An AV data reproducing method for reproducing AV data stored on a recording medium storing at least first AV data and second AV data both of which constitute a scene to be reproduced by switching with each other in a same time-line, wherein:

the first AV data and the second AV data are stored on the recording medium such that the first AV data is divided into first partial AV data in accordance with a predetermined rule, and the second AV data is divided into second partial AV data in accordance with a predetermined rule, and the first partial AV data and the second partial AV data, which are to be reproduced by switching with each other, are disposed alternately;

the recording medium further storing:

file system management information for handling as different files the first AV data and the second AV data;

a first AV data management information file for managing the first AV data;

a second AV data management information file for managing the second AV data; and a program information file for associating the first AV data with the second AV data for handling as a single content the first AV data and the second AV data, wherein:

the file system management information includes position information of the first partial AV data arranged in an order of reproducing the first partial AV data, and position information of the second partial AV data arranged in an order of reproducing the second partial AV data;

the program information file includes a filename of the first AV data management information file, a filename of the second AV data management information file, and a time stamp indicating a start time of the scene;

the first AV data management information file includes a time stamp indicating a start time of a respective video unit which is a constituent of the scene and can be an entry point for reproduction of the first AV data; and the second AV data management information file includes a time stamp indicating a start time of a respective video unit which is a constituent of the scene and can be an entry point for reproduction of the second AV data, the method comprising:

a first step of acquiring the file system management information from the recording medium;

a second step of acquiring the program information file from the recording medium; and a third step of acquiring the first AV data management information file and the second AV data management information file from the recording medium.

6. An AV data reproducing apparatus for reproducing AV data stored on a recording medium storing at least first AV data and second AV data both of which constitute a scene to be reproduced by switching with each other in a same time-line, wherein:

the first AV data and the second AV data are stored on the recording medium such that the first AV data is divided into first partial AV data in accordance with a predetermined rule, and the second AV data is divided into second partial AV data in accordance with a predetermined rule, and the first partial AV data and the second partial AV data, which are to be reproduced by switching with each other, are disposed alternately;

the recording medium further storing:

file system management information for handling as different files the first AV data and the second AV data;

a first AV data management information file for managing the first AV data;

a second AV data management information file for managing the second AV data; and a program information file for associating the first AV data with the second AV data for handling as a single content the first AV data and the second AV data, wherein:

the file system management information includes position information of the first partial AV data arranged in an order of reproducing the first partial AV data, and position information of the second partial AV data arranged in an order of reproducing the second partial AV data;

the program information file includes a filename of the first AV data management information file, a filename of the second AV data management information file, and a time stamp indicating a start time of the scene;

the first AV data management information file includes a time stamp indicating a start time of a respective video unit which is a constituent of the scene and can be an entry point for reproduction of the first AV data; and the second AV data management information file includes a time stamp indicating a start time of a respective video unit which is a constituent of the scene and can be an entry point for reproduction of the second AV data, the apparatus comprising:

a first section for acquiring the file system management information from the recording medium;

a second section for acquiring the program information file from the recording medium; and a third section for acquiring the first AV data management information file and the second AV data management information file from the recording medium.

7. A non-transitory computer readable recording medium for storing a program for causing a computer to reproduce AV data stored on a recording medium storing at least first AV data and second AV data both of which constitute a scene to be reproduced by switching with each other in a same time-line, wherein:

the first AV data and the second AV data are stored on the recording medium such that the first AV data is divided into first partial AV data in accordance with a predetermined rule, and the second AV data is divided into second partial AV data in accordance with a predetermined rule, and the first partial AV data and the second partial AV data, which are to be reproduced by switching with each other, are disposed alternately;

the recording medium further storing:

file system management information for handling as different files the first AV data and the second AV data;

a first AV data management information file for managing the first AV data;

a second AV data management information file for managing the second AV data; and a program information file for associating the first AV data with the second AV data for handling as a single content the first AV data and the second AV data, wherein:

the file system management information includes position information of the first partial AV data arranged in an order of reproducing the first partial AV data, and position information of the second partial AV data arranged in an order of reproducing the second partial AV data;

the program information file includes a filename of the first AV data management information file, a filename of the second AV data management information file, and a time stamp indicating a start time of the scene;

the first AV data management information file includes a time stamp indicating a start time of a respective video unit which is a constituent of the scene and can be an entry point for reproduction of the first AV data; and the second AV data management information file includes a time stamp indicating a start time of a respective video unit which is a constituent of the scene and can be an entry point for reproduction of the second AV data, the program causing the computer to perform:

a first step of acquiring the file system management information from the recording medium;

a second step of acquiring the program information file from the recording medium; and a third step of acquiring the first AV data management information file and the second AV data management information file from the recording medium.

* * * * *